US005636370A

United States Patent [19]
Sicsic et al.

[11] Patent Number: 5,636,370
[45] Date of Patent: Jun. 3, 1997

[54] SYSTEM AND METHOD FOR INTERFACING RISC BUSSES TO PERIPHERAL CIRCUITS USING ANOTHER TEMPLATE OF BUSSES IN A DATA COMMUNICATION ADAPTER

[75] Inventors: Patrick Sicsic, La Colle Sur Loup; Alain Benayoun, Cagnes Sur Mer; Jean-Francois LePennec, Nice; Patrick Michel, LaGaude, all of France

[73] Assignee: International Business Machines Corporation, Armonk, N.Y.

[21] Appl. No.: 454,448

[22] Filed: May 30, 1995

[30] Foreign Application Priority Data

Sep. 19, 1994 [EP] European Pat. Off. ............ 94480091

[51] Int. Cl.$^6$ ............................................ G06F 13/12
[52] U.S. Cl. ............................................ 395/500
[58] Field of Search ............................ 395/500, 600, 395/162, 417, 165, 842, 490; 364/246.11

[56] References Cited

U.S. PATENT DOCUMENTS

| | | | |
|---|---|---|---|
| 4,057,846 | 11/1977 | Cockerill et al. | |
| 5,193,167 | 3/1993 | Sites et al. | 395/490 |
| 5,333,259 | 7/1994 | Jung | 396/162 |
| 5,371,860 | 12/1994 | Mura et al. | 395/842 |
| 5,388,242 | 2/1995 | Jewett | 364/246.11 |
| 5,457,780 | 10/1995 | Shaw et al. | 395/165 |
| 5,530,822 | 6/1996 | Beavers et al. | 395/417 |
| 5,560,029 | 9/1996 | Papadopoulos et al. | 395/600 |

FOREIGN PATENT DOCUMENTS

| | | |
|---|---|---|
| 362425 | 5/1988 | European Pat. Off. |
| 392657 | 6/1990 | European Pat. Off. |
| 9000276 | 6/1989 | WIPO |

OTHER PUBLICATIONS

IBM Technical Disclosure Bulletin, vol. 26, No. 3B, Aug. 1983, pp. 1507–1511.

*Primary Examiner*—Kevin J. Teska
*Assistant Examiner*—Dan Fiul
*Attorney, Agent, or Firm*—Joscelyn G. Cockburn

[57] ABSTRACT

A conversion cache circuit, interfacing RISC busses to CISC peripheral circuits, provides master/slave Write and Read operations in a shared memory (130) and in the internal registers of the processor of said peripheral circuits (210). It enables RISC processor to Write and Read in the internal registers of the 8-bit processor in a salve operation while the 32-bit processor may perform the Write or Read operations to the shared memory through the conversion cache circuit in a master mode. The 32-bit processor may have access directly to the memory through its own direct access memory mechanism.

9 Claims, 18 Drawing Sheets

E1 / T1 Communication Adapter Block Diagram

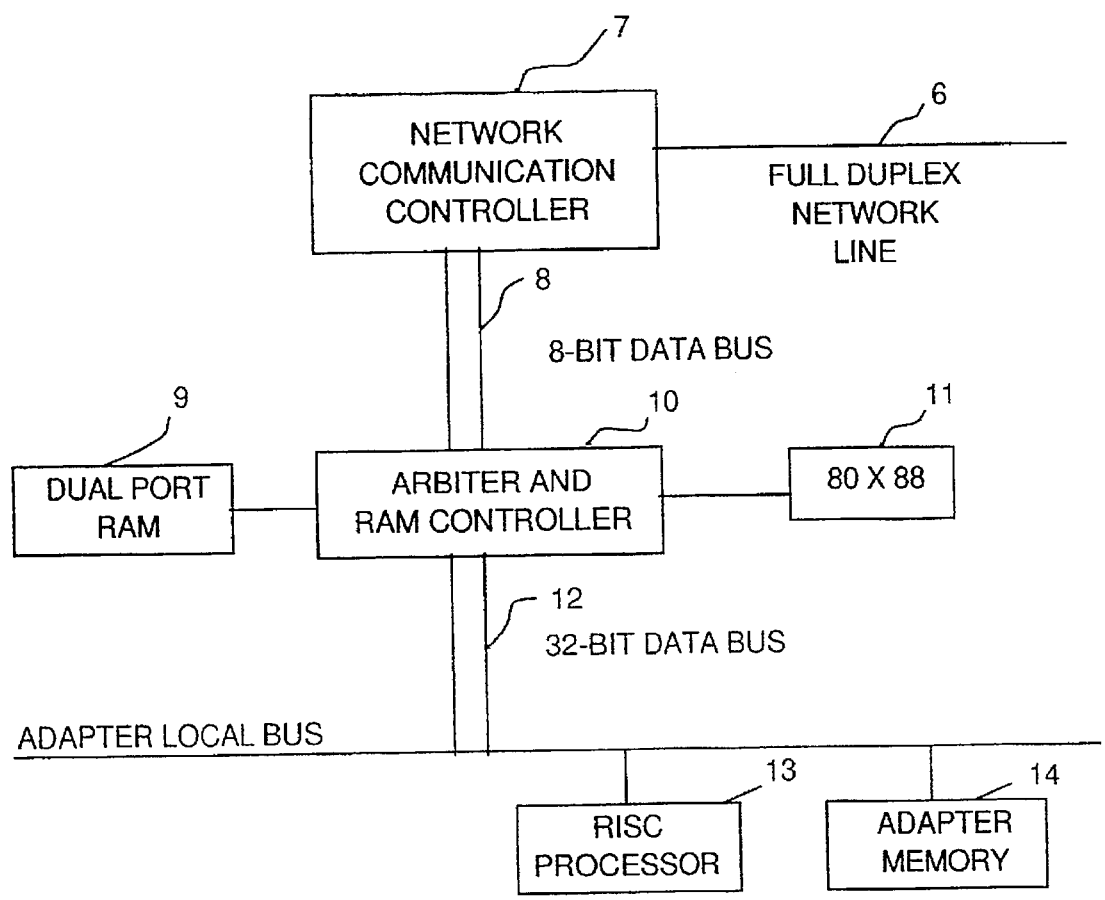
FIG. 1-A    PRIOR ART

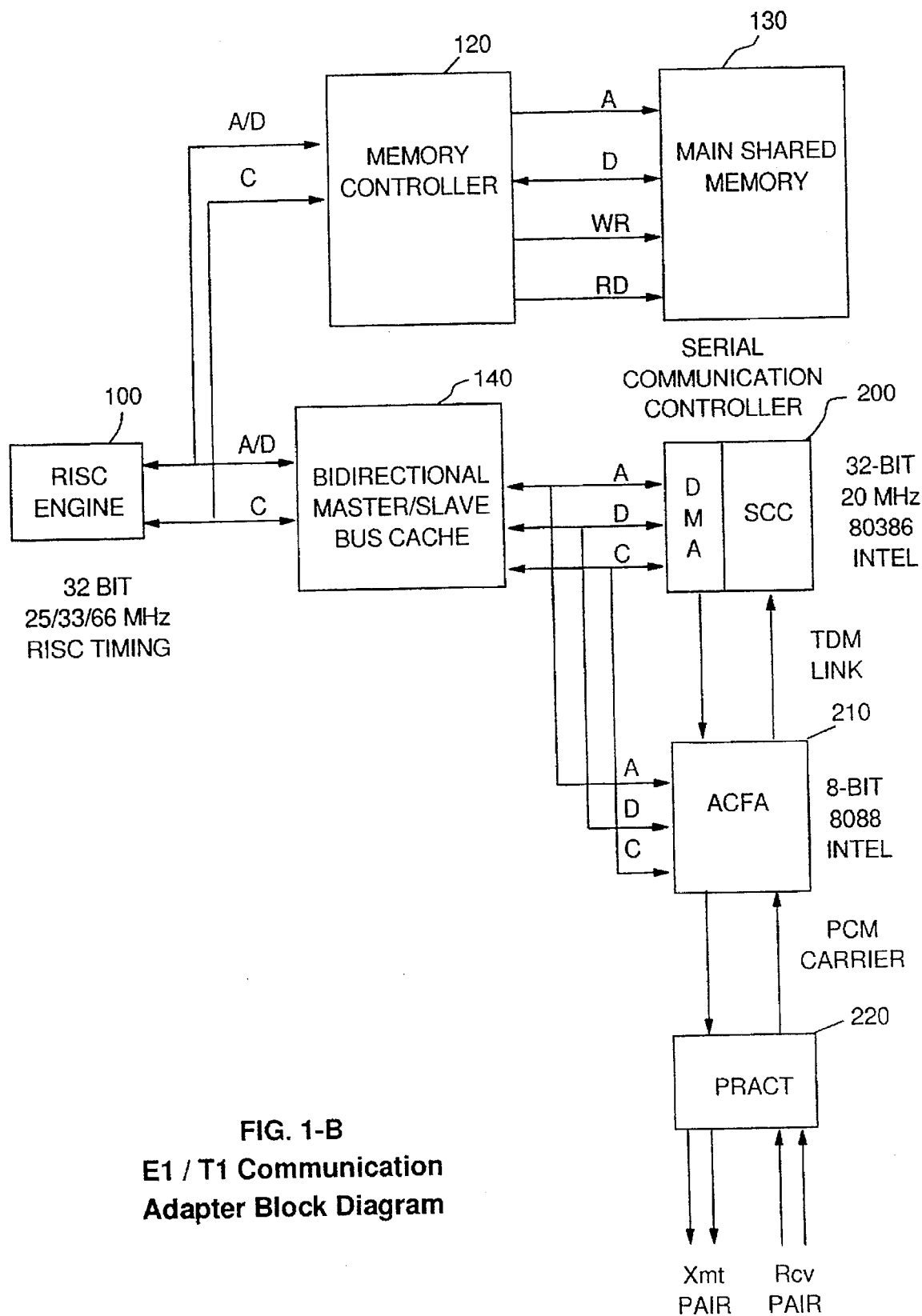
FIG. 1-B
E1 / T1 Communication
Adapter Block Diagram

Adapter Schematics Arrangement

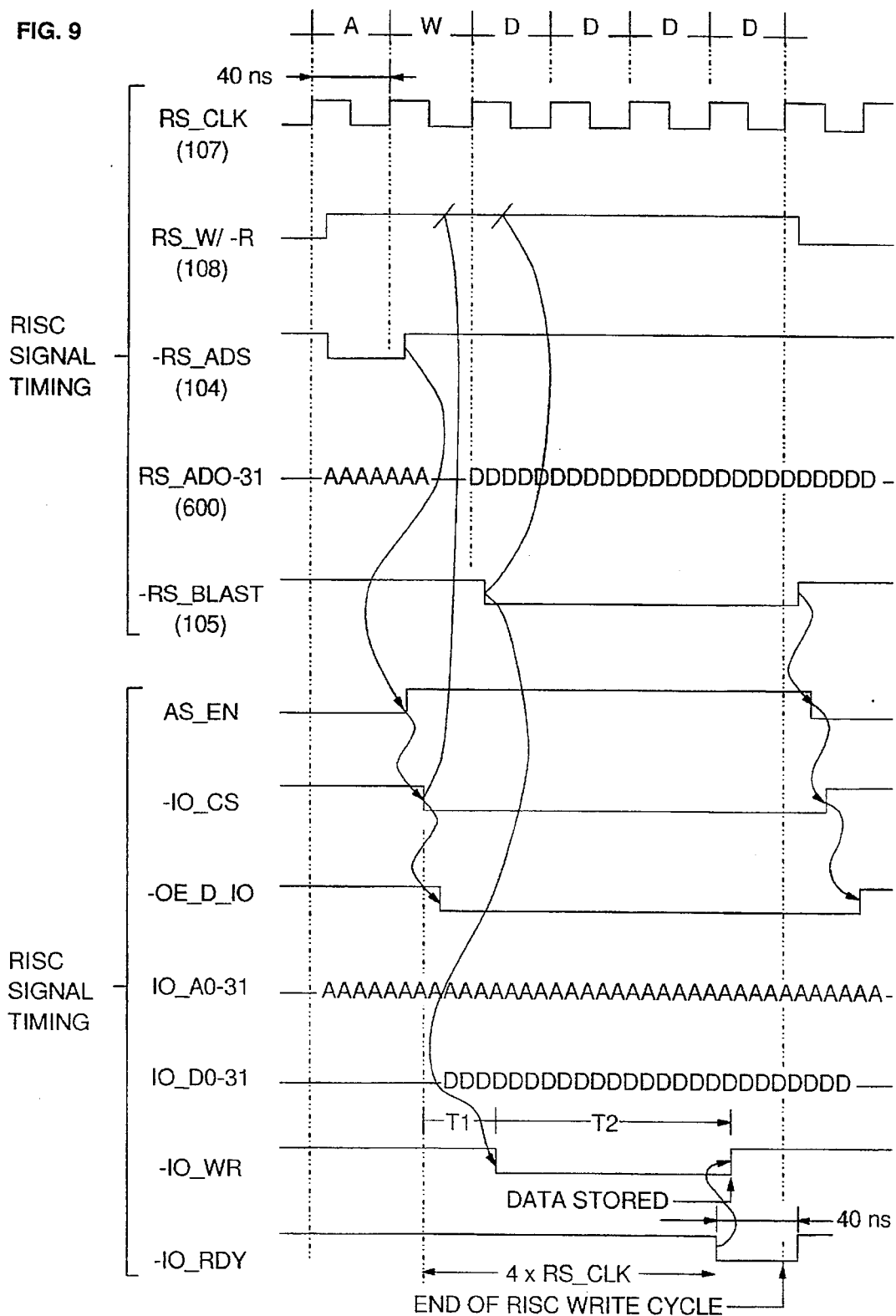
RISC PROCESSOR WRITE TIMING TO AN I/O (SLAVE OPERATION)
T1 = 30 ns IS THE AVERAGE ADDRESS SETUP TIME FOR AN i80x8x I/O
T2 = 130 ns IS THE AVERAGE WRITE PULSE WIDTH FOR AN i80x8x I/O

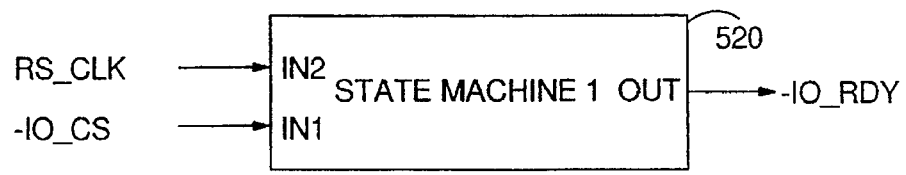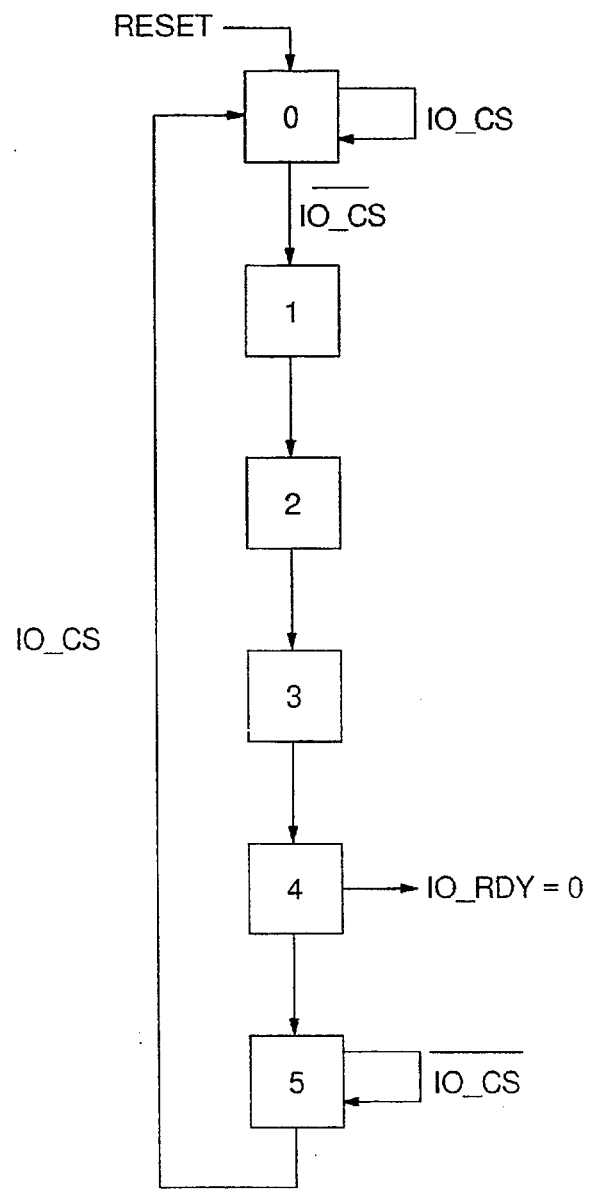
FIG. 11
GENERATION OF CONTROL SIGNAL IO_RDY

T1 = 90 ns IS THE AVERAGE DATA ACCESS TIME FROM AN i80x8x I/O

RISC PROCESSOR READ TIMING TO AN I/O (SLAVE OPERATION)

I/O MASTER WRITE TIMING TO SHARED MEMORY

CONTROL LOGIC CIRCUIT 4

GENERATION OF CONTROL SIGNALS FOR A
WRITE MASTER OPERATION (*) CREATED SIGNAL

I/O MASTER READ TIMING TO SHARED MEMORY

GENERATION OF CONTROL SIGNALS FOR A
WRITE SLAVE OPERATION

GENERATION OF CONTROL SIGNALS FOR A
READ MASTER OPERATION

5,636,370

SYSTEM AND METHOD FOR INTERFACING RISC BUSSES TO PERIPHERAL CIRCUITS USING ANOTHER TEMPLATE OF BUSSES IN A DATA COMMUNICATION ADAPTER

TECHNICAL FIELD OF THE INVENTION

The invention relates to a data communication system and more particularly to a system for interfacing RISC (Reduced Instruction Set Computer/Cycles) busses to CISC (Complex Instruction Set Computer) peripheral circuits.

BACKGROUND ART

In the world of telecommunication, it is required to use more and more powerful processors in order to cope with the increasing amount of data to transmit and to receive. Therefore, the new processors to be devised have to provide two main characteristics of the data exchanges that are high speed and large capacity.

RISC processor is one of the most powerful processors. It can operate at high frequencies 33/66 MHz and with a 32-bit data bus. Therefore, RISC processors are expected to be a rapidly expanding branch of technology. By providing a Reduced Instructions Set Computer/Cycles, a highly effective computer system may be devised. They are used in today's network communication controller components for interfacing the system bus of the communication system. However, RISC processor uses a particular interface bus for allowing the communication between the processor and its peripherals, involving particular control signals and timing diagrams. Therefore, the direct connection of RISC processors to the peripherals which were currently designed for usual non RISC processors, also known as CISC processors is not directly possible, especially when the CISC bus complies with traditional INTEL bus structure and comprises a non-multiplexed data bus separated from the address bus, common control lines, control signals and timing diagrams which differ from the ones in RISC environment.

There is a desire to provide an interface circuit which allows the direct conversion between the signals existing on a RISC bus, and those exchanged by the usual CISC peripheral circuits. One of the solution often used in the state of the art is to implement a dual port RAM shared by a RISC processor, a 80×88 microprocessor and an internal communication protocol, refer to FIG. 1-A. In such an environment, the data are transferred from a network line (6) to a dual port RAM (9) under the control of both a network communication controller (7) and the 80×88 processor (11) on an 8-bit CISC bus (8) and then from the dual port RAM (9) to the memory adapter (14) under the control of a RISC processor (13) on a 32-bit RISC bus (12). This dual port RAM (9) requires the implementation of an arbiter (10) and a controller (10) which both degrade the performance. Consequently the high number of components required degrades the performance of the data transfer within the communication adapter.

The present invention is devised by taking into consideration the following remark: all the existing data network communication components using CISC bus interface can be reused in a RISC environment without any additional development, avoiding therefore to develop a new set of 32-bit communication components.

SUMMARY OF THE INVENTION

The problem to be solved by the present invention is to provide a simple and effective conversion cache circuit for converting the RISC signals existing on the RISC bus to a set of control/data/address signals which are available on the usual CISC peripheral circuits.

This problem is solved by the method and the apparatus according to the present invention. Breifly, there is provided a conversion cache circuit in a data communication adapter for interfacing a RISC processor using a RISC interface bus to peripheral circuit using a CISC interface bus and connected to a network, said RISC interface bus comprising a bidirectional multiplexed address/data bus, RISC control lines and operating at the frequency defined by a first oscillator, said CISC interface bus comprising separated data bus and address bus, control lines and operating at a second frequency defined by a second oscillator running slower than the first oscillator; said conversion circuit and said RISC processor being connected by said RISC interface bus to a memory storage through a memory controller; said conversion circuit comprising:

first means for receiving addresses and data on said bidirectional multiplexed bus from the RISC processor and from said memory controller to transmit them separately on said CISC data bus and address bus to the peripheral circuit, in accordance with the CISC timing diagrams and whereby said RISC processor is allowed to have access for read or write operations into internal registers of said peripheral circuit; and second means for receiving addresses and data on said address CISC bus and data on said data CISC bus from the peripheral circuit to transmit on said bidirectional multiplexed RISC bus to the RISC processor and to the memory storage through the memory controller, in accordance with the RISC timing diagrams and whereby said peripheral circuit is allowed to have access for read or write operations into the memory storage.

The conversion method to be used in connection with the conversion circuit to enable the RISC processor to have access for read or write operations into the internal registers of said peripheral circuits comprises the steps of:

activating a write/read control signal RS_W/R from the RISC processor to indicate whether a write or a read operation is to be performed into the internal registers of said peripheral circuit;

activating a first control signal $RS_{13}$ ADS and a second control signal RS_BLAST from said RISC processor to transmit to a first control logic generating therefrom a third control signal AS_EN for enabling the read or write operations into said internal registers;

receiving an address from the RISC processor on a first latch responsive to said third control signal AS_EN for transmitting said address to an address decode and to a first buffer; wherein both the address decode circuit and the first buffer are responsive to a fourth control signal RS_HLDA deactivated by the RISC processor when it wishes to access the internal registers for Write/Read operations; and wherein said address decode circuit is also responsive to said third control signal AS_EN to select which of the internal registers the RISC processor wishes to access by providing a chip select control signal IO_CS to said peripheral circuit;

generating an activation signal OE_D_IO from a second control logic circuit responsive to said write/read control signal RS_W/R from RISC processor and to said chip select control signal IO_CS;

receiving the data transmitted from the RISC processor to a second buffer; said second buffer being responsive to said activation signal OE_D_IO for transmitting said data to the peripheral circuit;

generating a ready signal IO_RDY from a first state machine responsive to said chip select signal IO_CS;

generating a fifth control signal IO_WR from a third control logic circuit responsive to said ready signal IO_RDY and said chip select signal IO_CS to the peripheral circuit informing that the data are ready to be written into the internal registers;

generating a sixth control signal IO_RD from an OR gate responsive to the second control signal RS_BLAST and the write/read control signal RS_W/R of the RISC processor to said peripheral circuit informing that the data are ready to be read from the internal registers;

transmitting the data output from the selected internal registers of said peripheral circuit on said bus to a third buffer which therefrom transmits said data on said bidirectional multiplexed address/data RISC bus; and generating a signal from a fourth buffer responsive to said chip select signal IO_CS and to said ready signal IO_RDY to the RISC processor to inform that the write/read operation has been completed.

The method according to the present invention further enables the peripheral circuit to have access for write or read operations into the memory storage. It comprises the steps of:

generating a synchronization signal SYNC_BUS from a fourth control logic for synchronizing said RISC bus interface to said CISC bus interface, said fourth control logic being responsive to a seventh control signal RS_RDY of the memory controller and an eighth control signal SCC_ADS from the peripheral circuit;

generating respectively two control signals M_BLAST and M_ADS to fifth and sixth buffers from a second state machine responsive to said synchronization signal SYNC_BUS and to said seventh control signal RS_RDY, said fifth and sixth buffers being both responsive to the activation of said fourth control signal RS_HLDA activated by the RISC processor when said peripheral circuit wishes to access the memory storage to activate said first and second control signals RS_ADS and RS_BLAST;

transmitting from a seventh buffer addresses send by said peripheral circuit to the memory controller on said bidirectional multiplexed RISC bus, said seventh buffer being responsive to the signal M_ADS;

generating a write/read signal to the memory controller from an eighth buffer receiving a control signal of write or read operation SCC_W/R from the peripheral circuit and responsive to said fourth control signal RS_HLDA;

generating an active signal from an OR gate during the activation of said second control signal RS_BLAST to said third buffer for enabling the data to be transmitted from the peripheral circuit to the memory storage for a write operation;

generating a control signal D_STB from a fifth control logic responsive to said seventh control signal RS_RDY of said memory controller to a second latch connected to said second buffer to enable the data to be transmitted from the memory storage to the peripheral circuit for a read operation; and generating a ninth control signal SCC_RDY from a third latch responsive to the deactivation of said synchronization signal SYNC_BUS to inform said peripheral circuit of the completion of the write/read operation.

DESCRIPTION OF THE DRAWINGS

FIG. 1-A shows an example of an implementation used in the prior art.

FIG. 1-B illustrates a schematic view of a preferred embodiment of the invention, that is to say an E1/T1 communication adapter.

FIGS. 9–19 represent the timing diagrams illustrating the different control and data/address signals which are exchanged between the RISC processor and the CISC peripheral circuits.

FIG. 9 illustrates more specifically the timing of RISC Processor Write Slave operation to an I/O.

FIG. 10 illustrates the implementation of the Control Logics 640, 500 and 510 generating control signals for a Write Slave Operation.

FIG. 11 illustrates the implementation of a state machine used according to present invention which generates control signal IO_RDY for a Write Slave Operation.

FIG. 12 illustrates more specifically the timing of RISC Processor Read Slave operation to an I/O.

FIG. 13 illustrates the timing of the serial Communication Controller for a Write Master Operation.

FIG. 14 illustrates the timing of the I/O Write Master Operation into the Shared Memory.

FIG. 15 illustrates the implementation the Control Logic 310 generating control signal SYNC_BUS for a Write Master Operation.

FIG. 16 illustrates the implementation of a state machine used according to the present invention which generates control signals M_ADS and M_BLAST for a Write Master Operation.

FIG. 17 illustrates the timing of the serial Communication Controller for a Read Master Operation.

FIG. 18 illustrates the timing of the I/O Read Master Operation into the Shared Memory.

FIG. 19 illustrates the implementation the Control Logic 430 generating control signal -D_STB for a Read Master Operation.

DESCRIPTION OF THE PREFERRED EMBODIMENT OF THE PRESENT INVENTION

Figure 2:
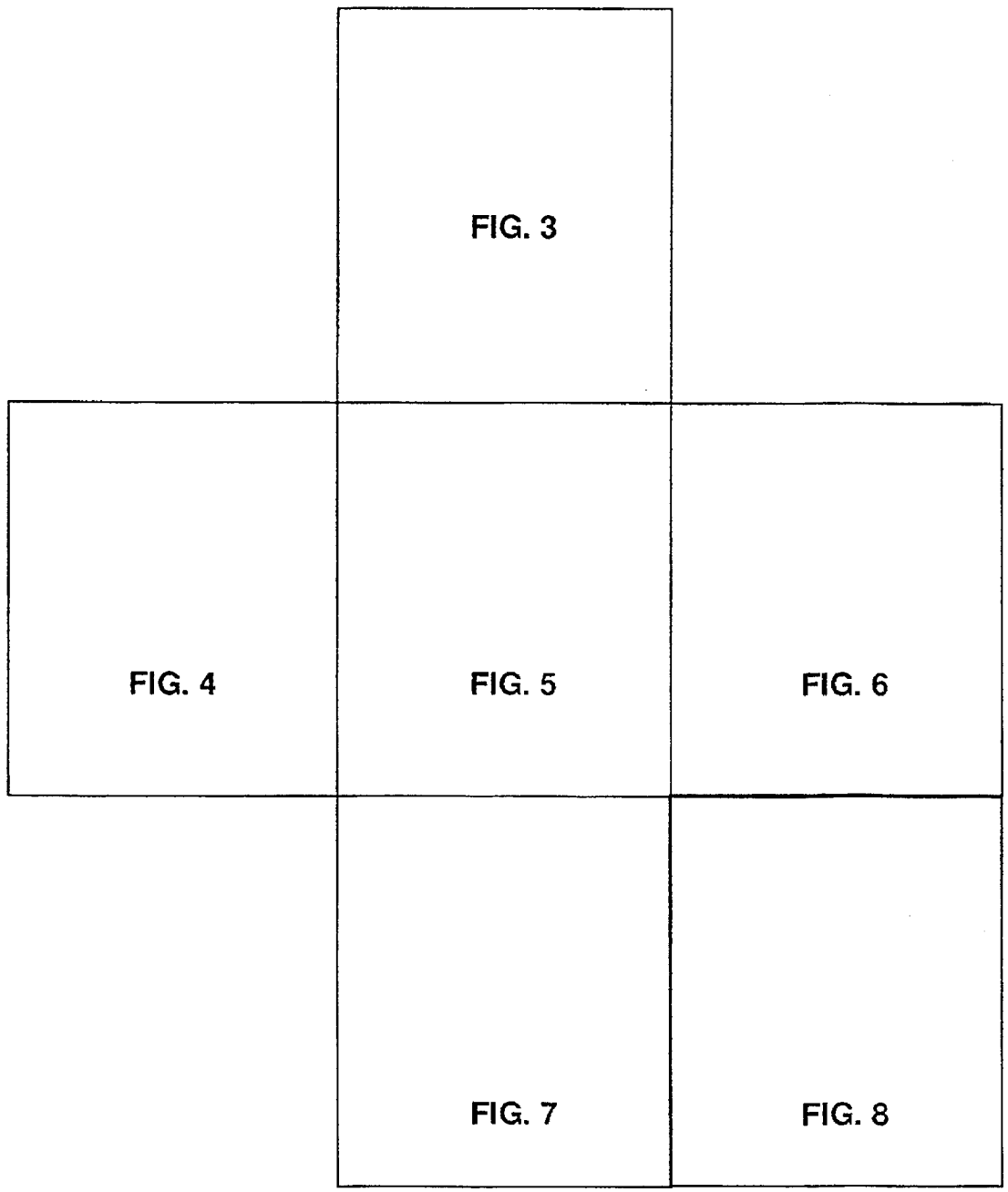
FIG. 2 shows the arrangement of the FIGS. 3 to 8 in order to provide an overall view of the present invention.
Figure 3:
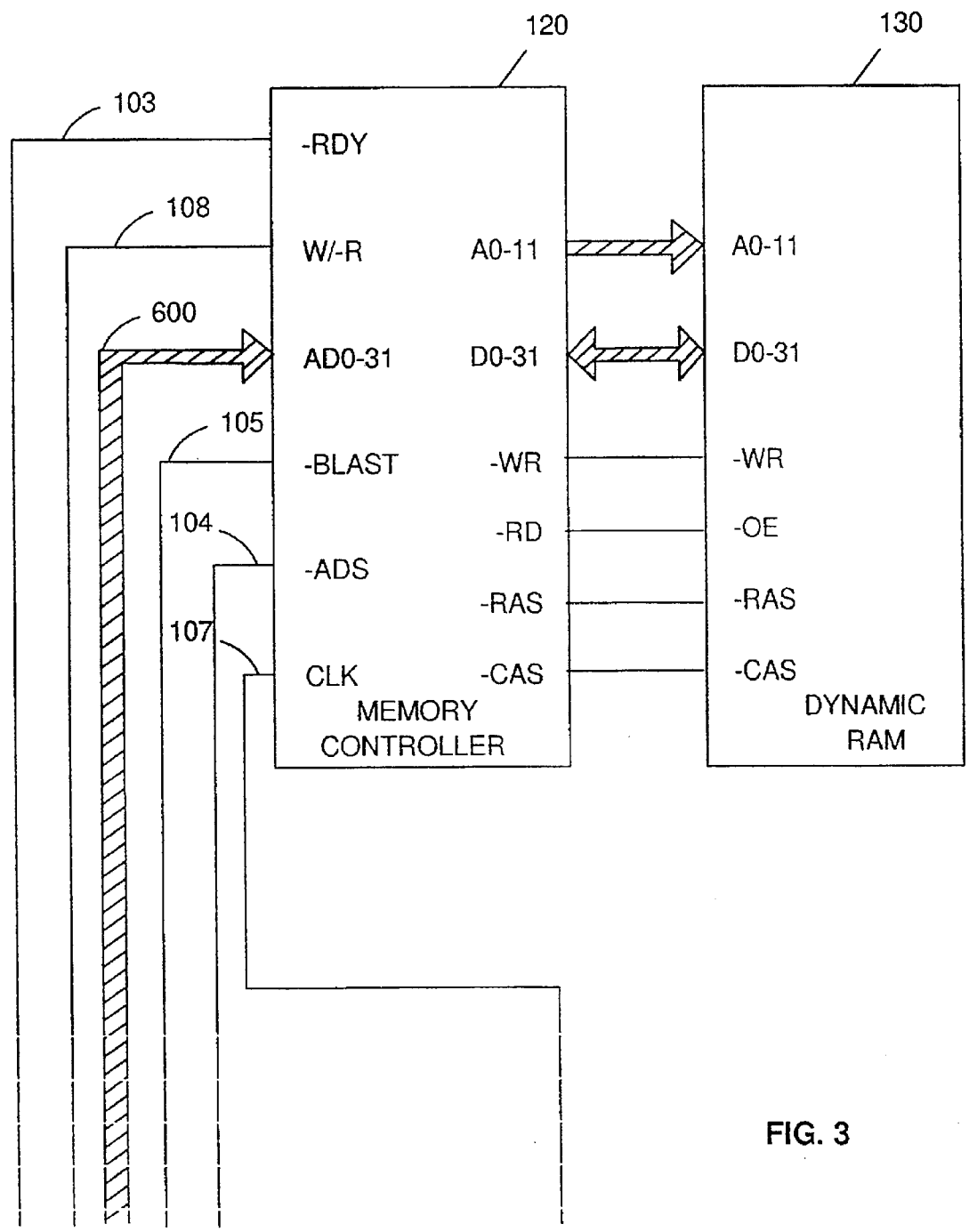
FIGS. 3–8 illustrate the structure of the E1/T1 communication adapter in accordance with the present invention.
Figure 4:
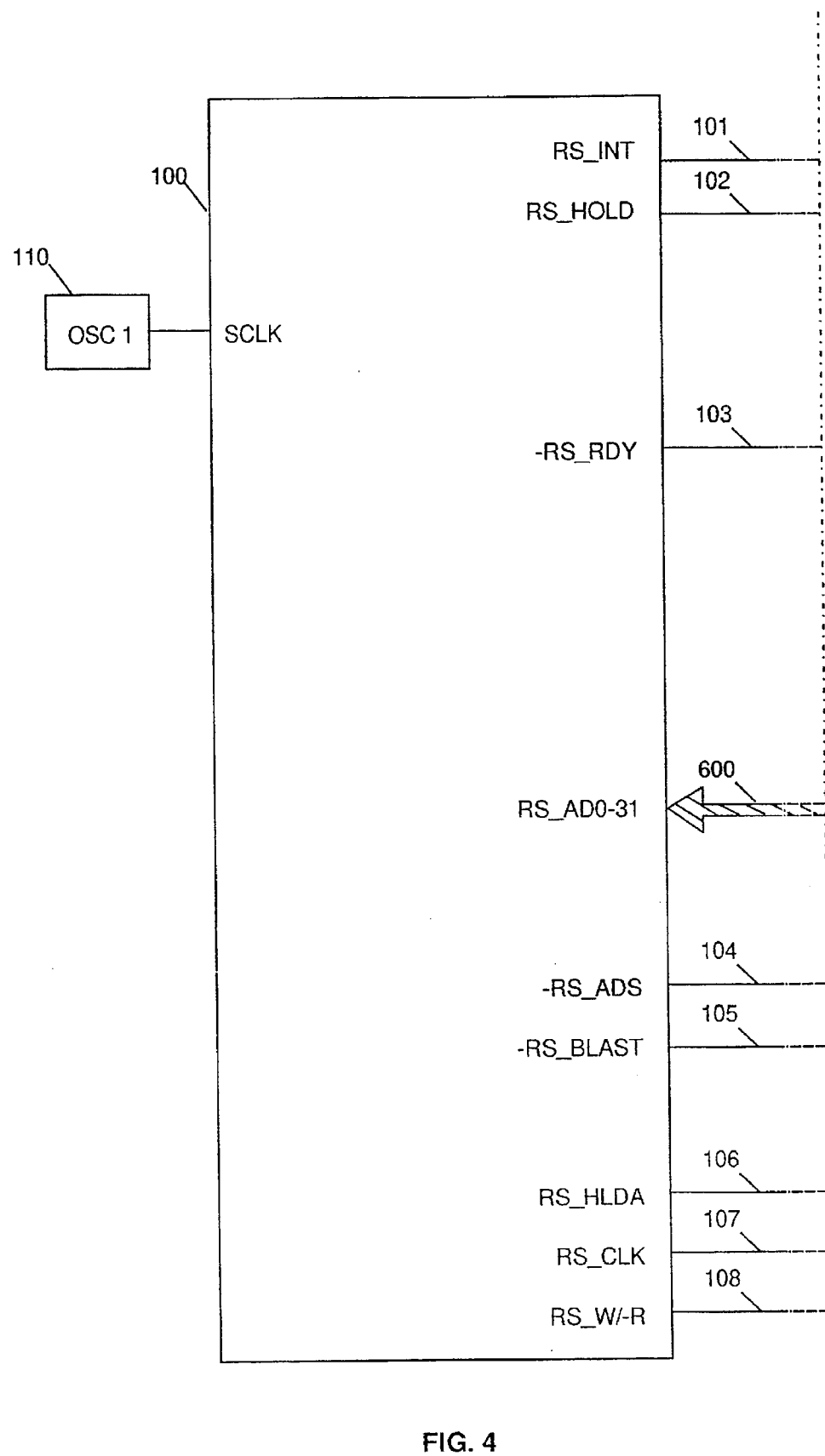
Figure 5:
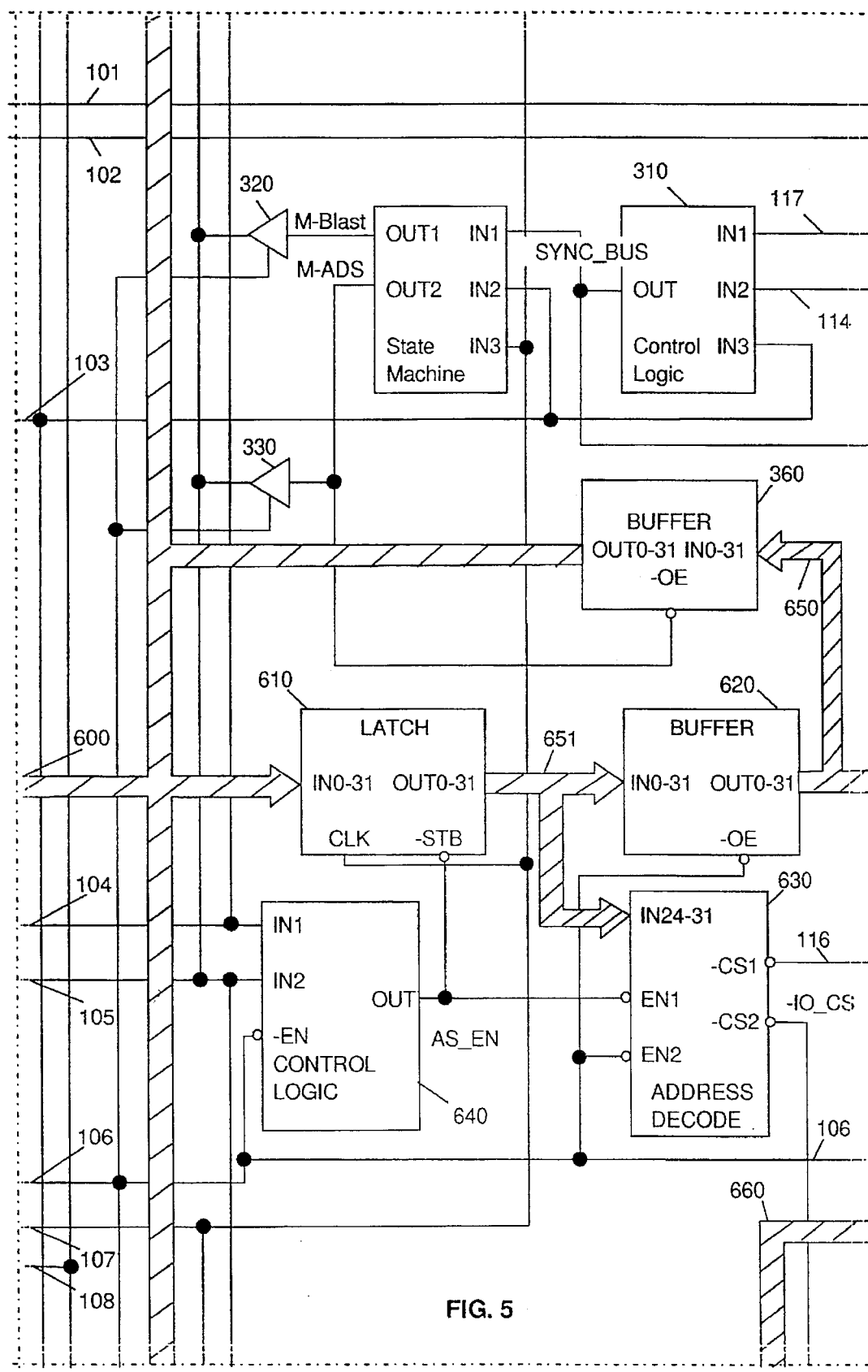
Figure 6:
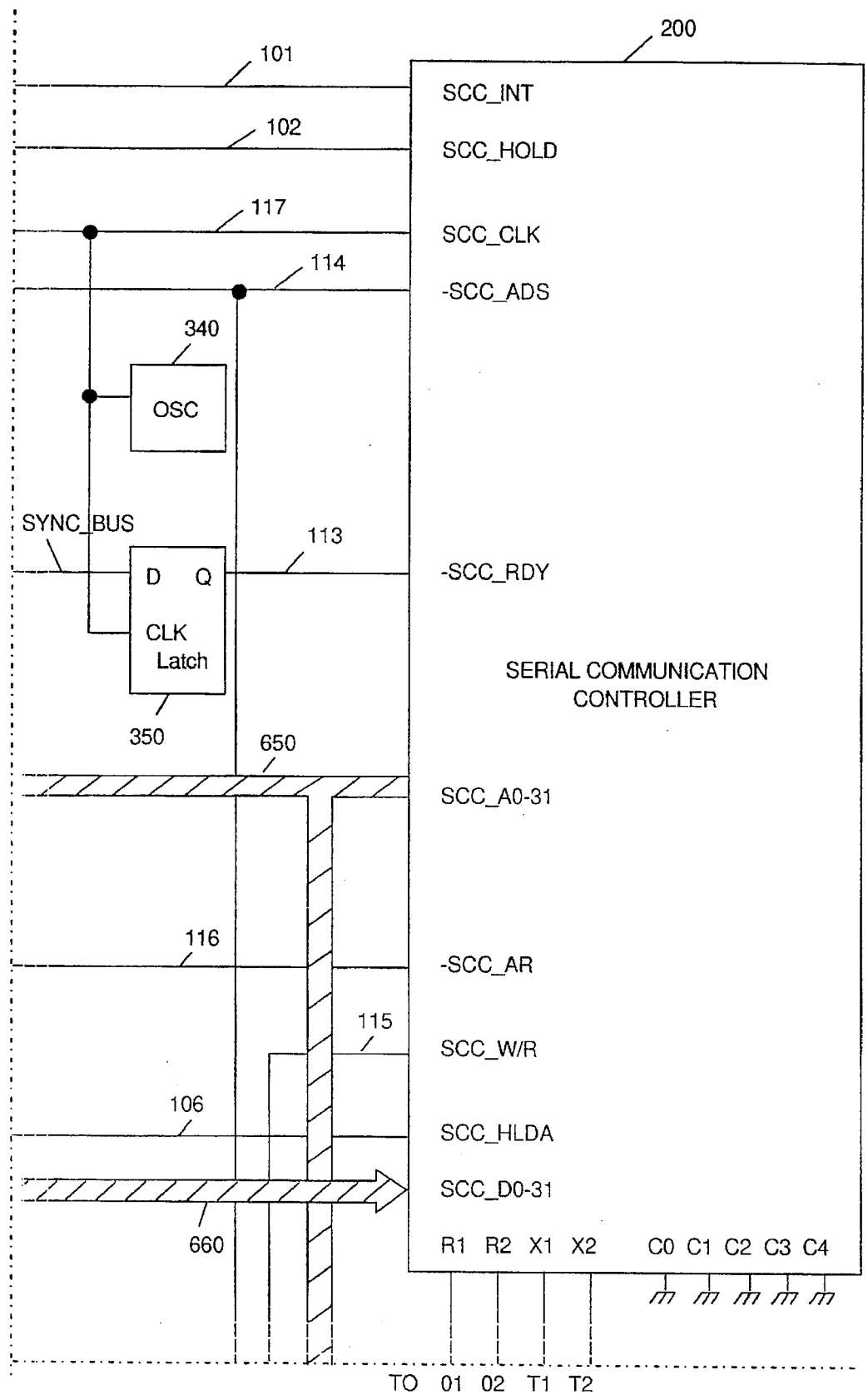
Figure 7:
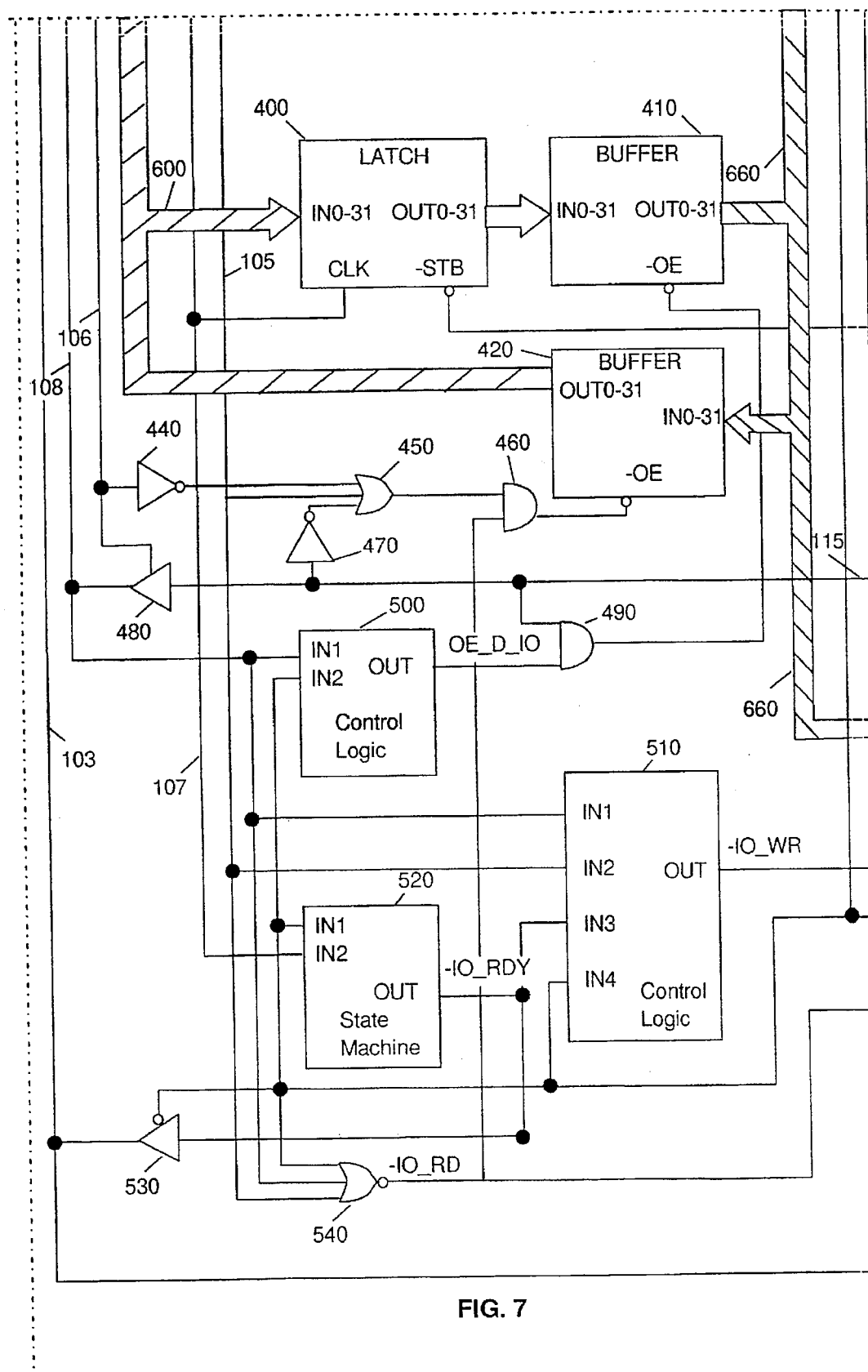
Figure 8:
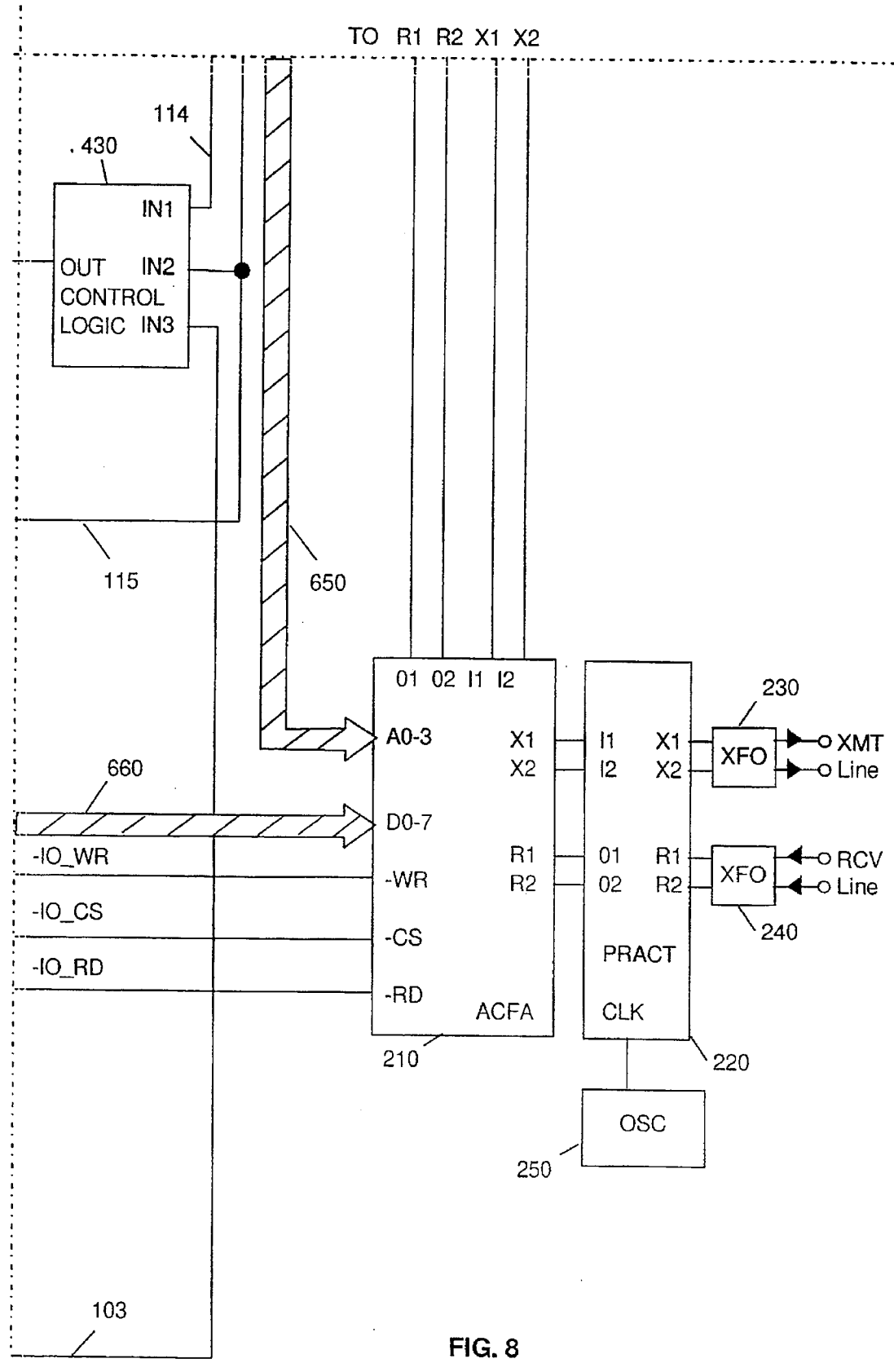

FIG. 1-B illustrates a preferred embodiment of the invention wherein the conversion circuit is used in order to provide an E1/T1 communication card. Such a card is known as being a high speed communication adapter which can be used either for European communication networks (E1) operating at 2,048 Mbits/s or for the American communication networks (T1) operating at 1,544 Mbits/s.

In this figure, the E1/T1 communication adapter communicates with the high speed network by means of a PRACT chip 220 (Primary Rate Adapter Clock Generator and Transceiver) which is marketed by SIEMENS under the reference PEB 22320. This circuit is well known by the telecommunication skilled man as providing the electrical interface with the telecommunication Xmit and RCV pairs on one hand. On the other hand, PRACT chip 220 provides a Pulse Coded Modulation (PCM) carrier link carrying the transmitted and received data. PRACT chip 220 communicates with an ACFA chip 210 (Advanced CMOS Frame Aligner) which is a chip also marketed by Siemens under the reference PEB 2035. ACFA chip 210 provides the conversion of the PCM carrier generated by PRACT chip 220 to Time Division Multiplex (TDM) signals which will be processed by a Serial Communication Controller (SCC) chip 200 provided by Siemens under the reference PEB 20320. The SCC chip 200 provides the conversion of the TDM link in a set of 32 independent parallel communication time slots. While ACFA chip 210 requires to be programmed by a RISC processor 100 through the conversion circuit 140, it should be noticed that the SCC chip 200 generates its own control signals for its own initialization. Therefore, the ACFA chip 210 is known to operate in a SLAVE mode while SCC chip 200 operates in a MASTER mode. The internal control signals which are generated inside the SCC chip 200 are produced by a Direct Memory Access (DMA) circuit therein located. Both the SCC chip 200 and ACFA chip 210 use a CISC bus which complies with the traditional INTEL bus structure. This bus comprises a non-multiplexed data bus, an address bus and the common control bus which comprises the common chip select, W/R, Hold, HLDA (hold acknowledge) signals, and the clock signal. Additionally this bus operates according to the specific timing of a CISC bus (T1, T2, T3, T4 and TW (wait) for slow I/O).

It should be noticed that the invention is not limited to the specific use of these chips dedicated to the implementation of the E1/T1 adapter. Functional equivalent of the PRACT, ACFA and SCC chips can be used by the skilled man. More generally, this invention is not limited to the telecommunication adapters.

In the preferred embodiment of the invention, a bidirectional Master/Slave bus Cache circuit 140 provides the conversion of the signals existing on the bus of RISC processor 100 and the common CISC bus connected to ACFA chip 210 and SCC chip 200. A dynamic Memory 130 is shared through a Memory controller 120 by both RISC processor 100 and SCC chip 200 via Cache circuit 140.

FIG. 2 illustrates the arrangement of FIGS. 3–8 which is necessary in order to provide a full comprehensive view of the structure of the telecommunication adapter in accordance with the present invention.

Firstly, it will be described the implementation of the E1/T1 adapter then the Write and Read operations in a Slave mode and in a Master mode. It must be kept in mind that the RISC processor 100 always performs Slave operations whereas the SCC 200 performs Master operations, for the Read and Write operations.

The hardware of the preferred embodiment of the present invention is described as follows:

The E1/T1 communication line is composed of two pairs, a transmit pair and a receive pair. The transmit pair is connected through a transformer 230 to PRACT chip 220 output pins X1 and X2. The receive pair is connected through a transformer 240 to pins R1 and R2 of the PRACT chip 220. The PRACT chip 220 receives on its input CLK pin a free-running clock provided by an oscillator 250.

On the opposite side, PRACT chip 220 has two input pins I1 and I2 which are respectively connected to ACFA chip 210 output pins X1 and X2. Its output pins 01 and 02 are also respectively connected to input pins R1 and R2 of ACFA chip 210.

The data path continues to the serial communication controller 200 (referred as SCC chip in the text). ACFA chip 210 has two input pins I1 and I2 which are respectively connected to output pins X1 and X2 of SCC chip 200, whereas output pins 01 and 02 of ACFA chip 210 are respectively connected to input pins R1 and R2 of SCC chip 200.

The ACFA chip 210 is a peripheral I/O slave to be programmed by the RISC processor 100. The programming interface of the ACFA chip 210 is composed of a 4-bit input pin A0-3 connected to an address bus 650, a bidirectional 8-bit pin D0-7 connected to a data bus 660, an input pin -CS receiving a chip select signal, input pins -WR and -RD respectively receiving a write signal and a read signal. It should also be kept in mind that the sign "minus" before the name of the signal means that the signal is activated at a low level. For example, the signal RS_W/-R means that a write operation is selected when the signal is at a high level, and a read operation is selected at a low level.

The pin A0-3 of ACFA chip 210 requires the first four bits of the 32-bit address bus 650 to which it is connected. This bus 650 is connected to the output pin OUT0-31 of a buffer 620 of the type 74ALS244 and to the output pin SCC_A0-31 of the SCC chip 200. The input pin IN0-31 of the buffer 620 is connected through a bus 651 to the output pin OUT0-31 of a latch 610 of the type 74ALS377. The pin IN24-31 of an address decode logic 630 requires the last eight bits of the 32-bit bus 651. The input pin IN0-31 of the latch 610 is connected to the RISC processor 100 by a pin RS_AD0-31, through a bidirectional multiplexed address/data bus 600.

The pin D0-7 of ACFA chip 210 requires the first eight bits of the 32-bit of the data bus 660 to which it is connected. This bus 660 is connected to an output pin OUT0-31 of a buffer 410 of the type 74ALS244 for a write operation in a slave mode and to an input pin IN0-31 of a buffer 420 of the type 74ALS244 for a read operation in a slave mode and to an input pin SCC_D0-31 of the 8CC chip 200, through a bidirectional 8-bit data bus 660. The output pin OUT0-31 of buffer 420 is connected to the multiplexed address/data bus 600. The input pin IN0-31 of buffer 410 is connected to an output pin OUT0-31 of a latch 400 of the type 74ALS377 through bus 661. The input pin IN0-31 of latch 400 is also connected to the bidirectional multiplexed address/data bus 600.

The pin chip select -CS of ACFA chip 210 receives -IO_CS signal from an output pin -CS2 of the address decode logic 630. The input write pin -WR of ACFA chip 210 also receives a signal -IO_WR from the output pin OUT of a control logic 510.

A first and second input pins IN1, IN2 of this control logic 510 are respectively connected to an output READ/WRITE pin RS_W/-R and to an output BLAST referred as pin -RS_BLAST of RISC processor 100 through leads 108 and 105. A third input pin IN3 of this control logic 510 receives -IO_RDY signal from the output pin OUT of a state machine 520, and a fourth input pin IN4 of this control logic 510 is connected to the output pin -CS2 of the address decode logic 630 and receives then the signal IO_CS.

The output pin OUT of the state machine 520 emits signal IO_RDY to an input of a buffer 530 of the type 74ALS125. A first input pin IN1 of the state machine 520 receives a signal -IO_CS from the output pin -CS2 of the address decode logic 630. Its second input pin IN2 receives the clock signal RS_CLK from the RISC processor 100 through lead 107.

The buffer 530 outputs a READY signal referred as -RS_RDY to the RISC processor 100 by the pin -RS_RDY through lead 103. Its enable input pin receives signal -IO_CS from the output pin -CS2 of the address decode logic 630. ACFA chip 210 has a Read input pin referred as -RD which receives a signal -IO_RD for reading in the internal register of ACFA chip from the output of a 3-input OR gate 540. The first, second and third input pins of this OR gate 540 respectively receive signal -IO_CS from the output pin -CS2 of the address decode logic 630, the read/write signal RS_W/-R through lead 108 and the BLAST signal referred as -RS_BLAST through lead 105 from the RISC processor 100.

The Output_Enable input pin (-OE) of the buffer 420 is connected to the output of a 2-input AND gate 460. One input of said AND gate 460 is connected to the output pin of a 3-input OR gate 450. The other input pin receives IO_RD signal from the output pin of OR gate 540.

In the same way, the Output_Enable input pin (-OE) of the buffer 410 is connected to the output of a 2-input AND gate 490. One input of said AND gate 490 receives a signal OE_D_IO from the output pin OUT of a control logic 500. The other input pin of the AND gate 490 receives from the SCC chip 200 the output read/write signal referred as SCC_W/-R through lead 115. A first input pin IN1 of said control logic 500 receives the read/write signal RS_W/-R from the RISC processor 100 through lead 108. Its second input pin IN2 receives the signal -IO_CS from the output pin -CS2 of the address decode logic 630.

The CLK control input pin of latch 400 receives from the RISC processor 100 the clock signal RS_CLK through lead 107. The strobe control input pin referred as -STB of latch 400 is connected to the output pin OUT of a control logic 430.

The Output_Enable input pin (-OE) Of the buffer 620 receives from the RISC processor 100 an output HOLD ACKNOWLEDGE signal (HLDA) referred as RS_HLDA through lead 106.

The CLK control input pin of latch 610 receives from the RISC processor 100 the clock signal RS_CLK through lead 107. The strobe control input pin -STB of latch 610 receives the signal AS_EN from the output pin OUT of a control logic 640. An input pin IN1 of the control logic 640 receives from the RISC processor 100 an ADDRESS STROBE signal referred as -RS_ADS through lead 104. An input pin IN2 of this control logic 640 receives the BLAST signal through lead 105 and its enable input pin -EN receives the HLDA signal through lead 106 from the RISC processor 100.

The enable input pin EN1 of the address decode logic 630 receives the signal AS_EN from the output pin OUT of the control logic 640 whereas its enable input pin EN2 receives the HLDA signal from the RISC processor 100 through lead 106.

In a master mode, the Serial Communication Controller SCC chip 200 will operate as a master peripheral, which means that a DMA is integrated into the component. The bus interface system of SCC chip 200 is composed of a 32-bit output address bus referred as SCC_A0-31 connected to bus 650, a bidirectional 32-bit data bus referred as SCC_D0-31 connected to bus 660, and control lines which are dedicated to an action request input signal referred as SCC_AR on lead 116, a clock input signal referred as SCC_CLK on lead 117, a ready input signal referred as -SCC_RDY on lead 113, an address strobe output signal referred as -SCC_ADS on lead 114, a read/write output signal referred as SCC_W/-R on lead 115, a bus request output signal referred as SCC_HOLD on lead 102, a bus hold acknowledge input signal referred as SCC_HLDA on lead 106, an interrupt output signal referred as SCC_INT on lead 101 and finally a start address encoding input bus C0-C4.

The address bus 650 transmits the address generated by SCC chip 200 to an input bus IN0-31 of a buffer 360 of the type 74ALS244, whose output bus OUT0-31 is connected to the bidirectional multiplexed address/data bus 600. The action request input signal referred as SCC_AR of the SCC chip 200 is connected to the output pin -CS1 of the address decode logic 630 through lead 116. Besides, the clock input signal referred as SCC_CLK is connected to the output pin of an oscillator 340 which provides a free-running clock on lead 117. This output pin is also connected to both an input pin IN1 of a control logic 310 and to an input pin CLK of a latch 350.

The ready input signal referred as -SCC_RDY is connected to the output pin Q of the latch 350 through lead 113. An input pin D of the latch 350 receives a signal SYNC_BUS from an output pin OUT of the control logic 310, said signal is also transmitted to the input pin IN1 of a state machine 300. The READY signal of the RISC processor 100 referred as -RS_RDY is transmitted to both an input IN3 of the control logic 310 and to an input IN2 of the state machine 300 through lead 103. By its pin IN3, the state machine 300 receives the clock signal of RISC processor 100 through lead 107.

The SCC chip 200 emits an address strobe output signal by its pin -SCC_ADS through lead 114 to both the input pin IN2 of the control logic 310 and to the input pin IN1 of the control logic 430. An input pin IN2 of control logic 430 receives through lead 115 the SCC chip 200 read/write output signal referred as SCC_W/-R, said signal is also transmitted to the second input pin of AND gate 490, to an input pin of an inverter 470 and to the input pin of a buffer 480 of the type 74ALS126. An input pin IN3 of the control logic 430 is connected to the pin -RS_RDY receiving the READY signal from RISC processor 100 through lead 103. The output pin of the buffer 480 is connected to the read/write pin of RISC processor 100 referred as RS_W/-R through lead 108. The HLDA signal of RISC processor 100 is transmitted by pin RS_HLDA through lead 106 to both the enable pin of the buffer 480 and to the input pin of an inverter 440 whose output pin is connected to one input of a 3-input OR gate 450. The second input and the third input of this OR gate 450 are respectively connected to the -RS_BLAST pin of RISC processor 100 through lead 105 and to the output pin of an inverter 470.

The SCC chip 200 has an output pin SCC_HOLD which transmits a Hold signal to an input of the RISC processor 100 referred as RS_HOLD through lead 102 to request the access to the system bus; the bus acknowledge input signal HLDA is received by the SCC chip 200 on SCC_HLDA pin through lead 106 from the RS_HLDA pin of the RISC processor 100; and the interrupt signal is transmitted from the SCC chip 200 by pin SCC_INT to a pin RS_INT of the RISC processor 100 through lead 101.

The Output_Enable input pin (-OE) of buffer 360 receives a signal M_ADS from an output pin OUT2 of a state machine 300 said output pin is also connected to an input pin of a buffer 330 of the type 74ALS126. The output pin of buffer 330 is connected to the -RS_ADS pin of the RISC processor 100 through lead 104, and its enable pin is connected to the RS_HLDA pin of RISC processor 100 through lead 106. And an output pin OUT1 of the state machine 300 transmits a signal M_BLAST to an input pin of a buffer 320 of the type 74ALS126 whose output transmit a signal BLAST to the RS_BLAST pin of the RISC processor 100 through lead 105. The enable pin of the buffer 320 receives the Hold Acknowledge signal from the pin RS_HLDA of the RISC processor 100 through lead 106.

The system memory is composed of a memory controller (IBM P/N 34G1519) 120 and a dynamic RAM 130 which is connected to the memory controller 120 as described hereafter.

A bidirectional 32-bit data bus D0-31 carries the data between the memory controller 120 and the dynamic RAM. A unidirectional 12-bit address bus A0-11 carries the address from the memory controller 120 to the dynamic RAM 130.

In the same way, four control lines between the two entities enable respectively the dynamic RAM 130 input write lead (-WR) to receive a write signal from the memory controller 120 output write lead (-WR), the dynamic RAM input Output_Enable pin (-OE) to receive a read signal from the memory controller 120 output read lead (-RD), and respectively the dynamic RAM input Row Address Signal lead (-RAS) and Column Address Signal lead (-CAS) to receive data relative to the Row and Column from the the memory controller 120 output Row Address Signal lead (-RAS) and Column Address Signal lead (-CAS).

This memory controller 120 is also connected to the internal system bus and control lines of the cache circuit 140. The address and data are received by said memory controller 120 on pin AD0-31 through the bidirectional multiplexed 32-bit address/data bus 600, and the control signals are transmitted in the following way. The memory controller 120 outputs a ready signal on pin -RDY through lead 103 to either the bus cache circuit 140 or the RISC processor 100; it receives an input read/write signal on pin W/-R from either the bus cache circuit 140 or the RISC processor 100 through lead 108. The BLAST and ADDRESS STROBE Signals are respectively received on its pin referred as -BLAST and -ADS from either the bus cache circuit 140 or the RISC processor 100 through lead 105 and lead 104; and its input CLOCK signal is received through lead 107 from the pin RS_CLK of RISC processor 100.

The output pin of an oscillator 110 is connected to the input pin SCLK of the RISC processor 100 to transmit the clock signal.

In order to understand the description of the different operations which will follow, it must be kept in mind that when the memory controller 120 is not addressed, both its ready output signal, pin -RDY and its multiplexed address/data bus 600, pin AD0-31 are floating.

The WRITE and READ operations according to the MASTER and SLAVE modes which are to be performed according to the present invention are now described in accordance to the associated figures.

The internal operations of the cache circuit 140 are performed in order to provide the conversion between the RISC bus and the common CISC bus. This full disclosure will be performed by successively describing the WRITE_ SLAVE operation by which the RISC processor 100 programs the internal registers of the ACFA chip 210. In the same ways, a READ_SLAVE operation enables the RISC processor 100 to read the contents of the internal registers of ACFA chip 210. A WRITE_MASTER operation permits the SCC chip 200 to write a word into the main memory 130. Conversely, a READ_MASTER operation enables the SCC chip 200 to read a word from the main memory 130.

In this part of the description, the name of the signals are willingly associated to the pins of the SCC chip, the ACFA chip, the RISC processor, the memory controller and the main memory. As previously said, it should also be kept in mind that the sign "minus" before the name of the signal means that the signal is activated at a low level. For example, the signal RS_W/-R means that a write operation is selected when the signal is at a high level, and a read operation is selected at a low level.

I) WRITE OPERATION IN SLAVE MODE (write_slave operation)

The WRITE_SLAVE operation is described with reference to the FIGS. 9, 10 and 11. By this operation, RISC processor 100 is allowed to write parameters into the internal registers of ACFA chip 210. This will now be described in association with the timing diagrams shown in FIG. 9. Additionally, FIG. 10 describes the three control logics (640, 500 510) which are used for generating respectively the slave control signals (AS_EN, -OE_D_IO and -IO_WR) which will be described hereinafter with more details, and FIG. 11 illustrates the basic operations of the state machine 520.

Assuming that RISC processor 100 wishes to program one internal register located in the ACFA chip 210. RISC processor 100 outputs the RS_W/-R signal on lead 108 and also activates an Address Strobe signal on pin -RS_ADS through lead 104, and activates a BLAST signal on pin -RS_BLAST through lead 105 in accordance with its internal clock. In our example, the RISC internal timing clock is set to 25 Mhz.

During the activation of the -RS_ADS signal, RISC processor 100 outputs the address of an ACFA chip 210 register onto the multiplexed address/data bus 600. The address is latched into latch 610 onto the rising edge of STB strobe input signal. This control signal is received from the output of the control logic circuit 640 (referred as AS_EN in FIG. 9). For a write slave operation RISC processor 100 does not activate the RS_HLDA signal and therefore the output of the control logic circuit 640 is enabled. This output signal AS_EN is activated onto the rising edge of the -RS_ADS signal and is deactivated onto the rising edge of the -RS_BLAST signal.

The latched address is transmitted to the input bus of an Address_decode logic 630 and to ACFA chip 210 through the bus 650 via buffer 620. The Output_Enable pin of buffer 620 is connected to the RS_HLDA output lead of RISC processor 100. For a write slave operation RISC processor 100 does not activate the RS_HLDA signal and therefore buffer 620 is enabled.

The address received by circuit 630 is decoded and the CS2 chip select control signal (referred as -IO_CS in FIG. 9) is activated, thus selecting the register of the ACFA chip 210 that the RISC processor 100 wishes to access. This decode operation is performed since the RS_HLDA signal which is transmitted through lead 106 to the EN2 enable input pin of address decode circuit 630 is maintained deactivated by processor 100. Additionally, the EN1 enable input pin of the address decode circuit 630 receives the activated signal AS_EN.

Then, and while activating RS_BLAST signal on lead 105, RISC processor 100 generates the data to be loaded into the internal register of ACFA chip 210 on the multiplexed address/data bus 600. The contents of the latter bus is transmitted through latch 400 since its STB strobe input pin is deactivated by the control logic circuit 430 for a RISC processor 100 write slave operation. The output of latch 400 is transmitted to ACFA chip 210 onto bus 660 through the buffer 410. This is achieved since an activation signal is transmitted to the Output_Enable pin of buffer 410 from the control logic circuit 500 through AND gate 490. This control logic circuit 500 generates a signal referred as -OE_D_IO on FIG. 9. This signal is activated onto the falling edge of the signal generated at the C52 output pin of Address_ decode circuit 630 when RISC processor 100 does a write operation to ACFA chip 210 and is deactivated onto the rising edge of the signal generated at the C52 output pin of Address_decode circuit 630. The WRITE input pin (-WR) of ACFA 210 being connected to the output pin of the control logic circuit 510, receives a write signal according to the CISC timing specifications which are complying with the INTEL 8088 in the preferred embodiment of the invention.

The control logic circuit 510 generates a signal referred as -IO__WR on FIG. 9. This signal is activated on the falling edge of the -RS__BLAST signal when RISC processor 100 does a write operation to ACFA chip 210 and is deactivated on the falling edge of the Ready signal (referred as -IO__RDY in FIG. 9) generated by the state machine circuit 520.

On the rising edge of the write signal transmitted to the WRITE input pin (-WR) of ACFA chip 210, the data carried on data bus 660 is stored within ACFA chip 210. At this time, a one clock pulse width is generated by the state machine circuit 520 which is transmitted to the -RS__RDY input pin on lead 103, through the buffer 530 which is activated by the signal generated at the CS2 output pin of Address__decode circuit 630. The RISC processor 100 detects this pulse and is made aware that the data to be loaded into the ACFA chip 210 is completed. Then, RISC processor 100 deactivates RS__W/-R signal on lead 108 and -RS__BLAST signal on lead 105 which are transmitted to the three control logic circuits (640, 500 and 510), and the signals AS__EN, -OE__D__IO, -IO__WR and -IO__CS return to idle state.

It should be noticed that the above description can be straightforwardly adapted for providing a WRITE operation in any kind of CISC peripherals by the RISC processor 100. Therefore, the invention can be used for providing the possibility to program another telecommunication chip. Also, the invention can be used for allowing a write operation in a peripheral circuit connected in a multi-purpose Information Handling System (IHS).

Figure 10:
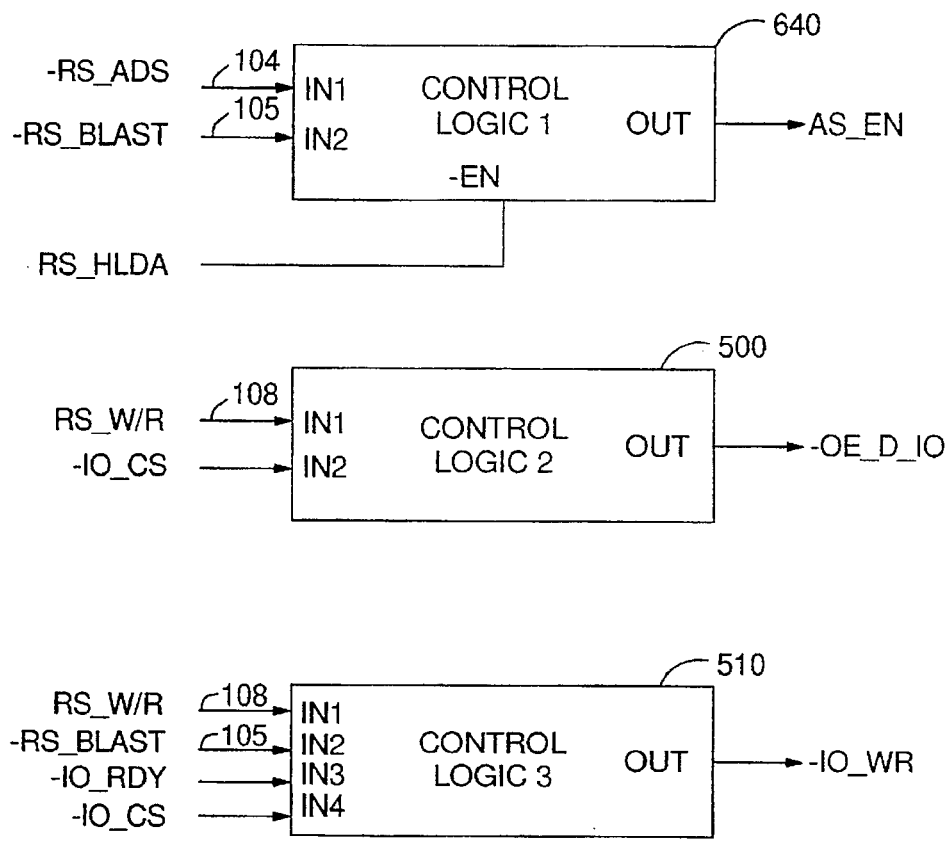

FIG. 10 shows the signals AS__EN, -OE__D__IO and -IO__WR respectively generated by the three control logics (640, 500, 510). As is shown in this figure, the control logic 640 has two inputs IN1 and IN2 which respectively receives the signals -RS__ADS (lead 104) and -RS__BLAST (lead 105), and an enable input pin -EN receiving the Hold Acknowledge signal RS__HLDA from the RISC processor. It generates the output signal AS__EN. The control logic 500 has two inputs IN1 and IN2 which respectively receive the signals RS__W/-R (lead 108) and -IO__CS (from the address decode 630), and outputs the signal -OE__D__IO. The control logic 510 has four inputs IN1-IN4 which respectively receive the signals RS__W/-R (lead 108), -RS__BLAST (lead 105), -IO__RDY (from the state machine 520) and -IO__CS (from the address decode 630). It generates the output signal -IO__WR.

FIG. 11 shows the implementation of the state machine 520 according to the present invention. This state machine 520 has two inputs IN1 and IN2 which respectively receive the signals -IO__CS generated by the address decode 630 and the clock signal RS__CLK from the RISC processor 100, and it generates the output signal -IO__RDY.

According to the preferred embodiment of the present invention, the state machine 520 has six states (state 0 to state 5). It operates according to the clock signal RS__CLK received through lead 107 at the frequency of 25 MHz from the RISC processor and the signal -IO__CS generated by the address decode 630. It is kept at state 0 as long as the signal -IO__CS is at its high level. When signal -IO__CS is activated (low level) it goes to state 1 and passes successively to state 4 at which step the state machine 520 sets the IO__RDY signal to zero for one clock. Afterwards, the state machine returns to state 0 when the signal IO__CS is at high level.

II) READ OPERATION IN SLAVE MODE (read__slave operation)

By the READ__SLAVE operation, RISC processor 100 is allowed to read parameters into the internal registers of ACFA chip 210. This will now be described in association with the timing diagrams shown in FIG. 12.

Assuming that RISC processor 100 wishes to read one internal register located into ACFA chip 210. RISC processor 100 outputs the RS__W/-R signal on lead 108 and also activates the -RS__ADS signal on lead 104, and activates the RS__BLAST signal on lead 105 in accordance with its internal clock.

During the activation of the -RS__ADS signal, RISC processor 100 outputs the address of an ACFA chip 210 register onto the multiplexed address/data bus 600. The address is latched into latch 610 onto the rising edge of STB strobe input signal. This control signal is received from the output of the control logic circuit 640 (referred as AS__EN in FIG. 12). For a read slave operation RISC processor 100 does not activate the RS__HLDA signal and therefore the output of the control logic circuit 640 is enabled. This output signal is activated onto the rising edge of the RS__ADS signal and is deactivated onto the rising edge of the -RS__BLAST signal.

The latched address is transmitted to the input bus of the Address__decode logic 630 and to the bus 650 of ACFA chip 210 via buffer 620. The Output__Enable pin of buffer 620 is connected to the RS__HLDA output pin of RISC processor 100. For a read slave operation RISC processor 100 does not activate the RS__HLDA signal and therefore buffer 620 is enabled.

Figure 12:
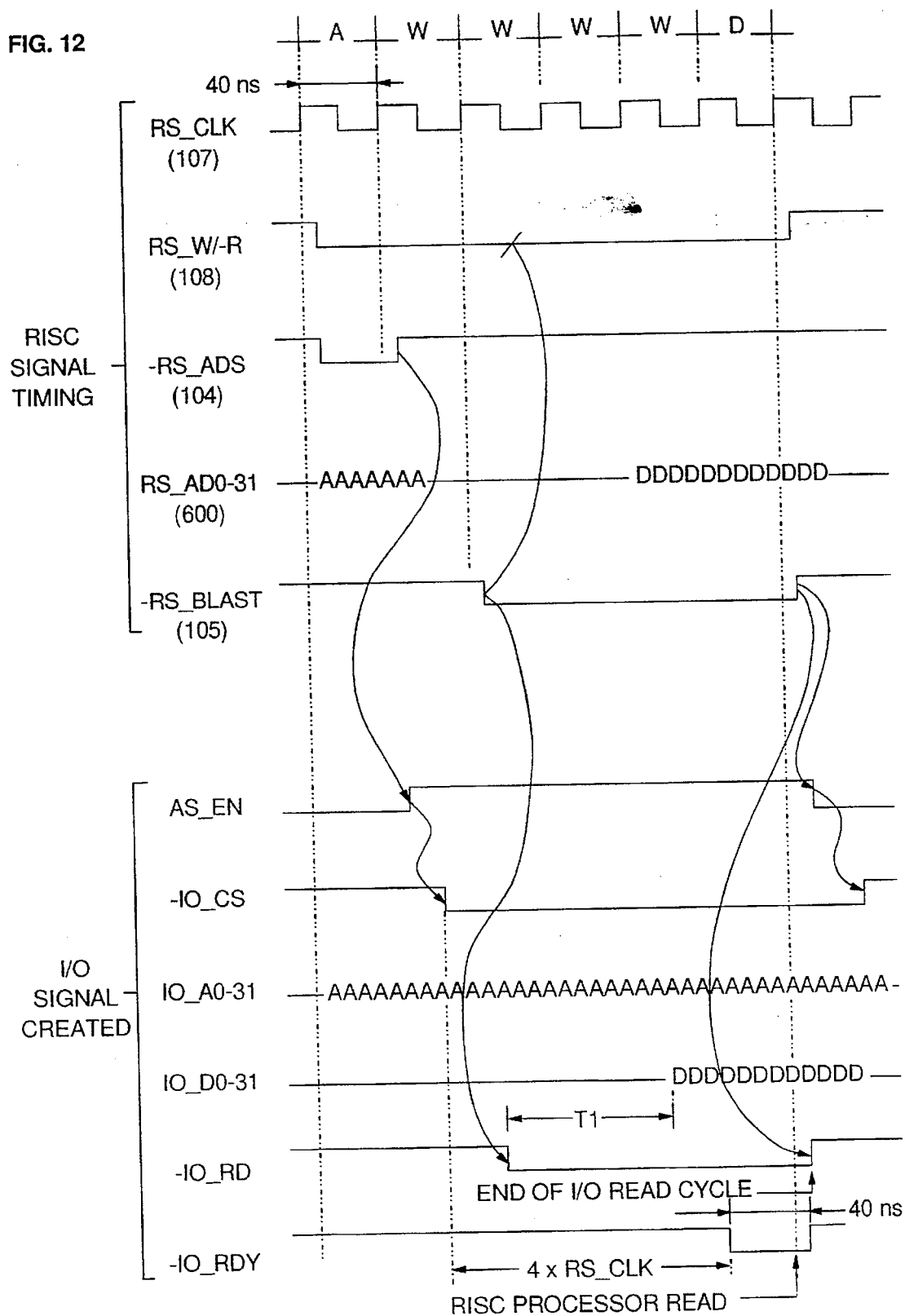

The address received by the address decode logic 630 is decoded and the -CS2 chip select control signal, referred as -IO__CS in FIG. 12, is activated, thus selecting the register of ACFA chip 210 that the RISC processor 100 wishes to access. This decode operation is performed since the RS__HLDA signal which is transmitted to the EN2 enable input pin of address decode circuit 630 is maintained deactivated by RISC processor 100. Additionally, the enable input pin EN1 receives the activated signal which is generated at the output of the control logic circuit 640.

The READ input pin (-RD) of ACFA chip 210 being connected to the output of the 3-input OR gate 540, receives a read signal -IO__RD according to the CISC timing specifications which are complying with the INTEL 8088 in the preferred embodiment of the invention.

OR gate 540 generates a signal referred as -IO__RD on FIG. 12. This signal is activated onto the falling edge of the -RS__BLAST signal when RISC processor 100 reads an internal register of ACFA chip 210 and is deactivated onto the rising edge of the -RS__BLAST signal.

Then, and while receiving an active read input signal, ACFA chip 210 outputs the contents of the selected register onto bus 660 after a delay of T1, known as the access time. The data is then transmitted onto the multiplexed address/data bus 600 through the buffer 420. This is achieved since an activation signal is transmitted to the Output__Enable pin of buffer 420 from OR gate 540 and through AND gate 460.

While the contents of the selected ACFA chip 210 register is available onto the multiplexed address/data bus 600, a one-clock pulse width is generated by the state machine circuit 520. This pulse is transmitted to the -RS__RDY input pin of the RISC processor 100, through the buffer 530 which is activated by the signal -IO__CS generated at the -CS2 output pin of Address__decode circuit 630.

The RISC processor 100 detects this pulse, reads the contents of the selected ACFA chip 210 register onto the multiplexed address/data bus 600 and deactivates its RS__W/-R signal on lead 108 and -RS__BLAST signal on lead 105. Both signals are respectively transmitted to the OR gate 540 and to the control logic 640 and then the signals -IO__RD, -IO__CS and AS__EN return to idle.

It should be noticed that the above description can be straightforwardly adapted for providing a READ operation in any kind of CISC peripherals to the RISC processor 100. Therefore, the invention can be used for providing the possibility to program another telecommunication chip. Also, the invention can be used for allowing a READ operation in a peripheral circuit connected in a multi-purpose Information Handling System (IHS).

The Master access is a WRITE or READ operation to the memory controller performed by the integrated direct memory access of the serial communication controller 200. The Cache circuit (or conversion circuit) 140 handles master 32-bit bidirectional data transfers.

III) WRITE OPERATION IN MASTER MODE (write master operation)

Figure 13:
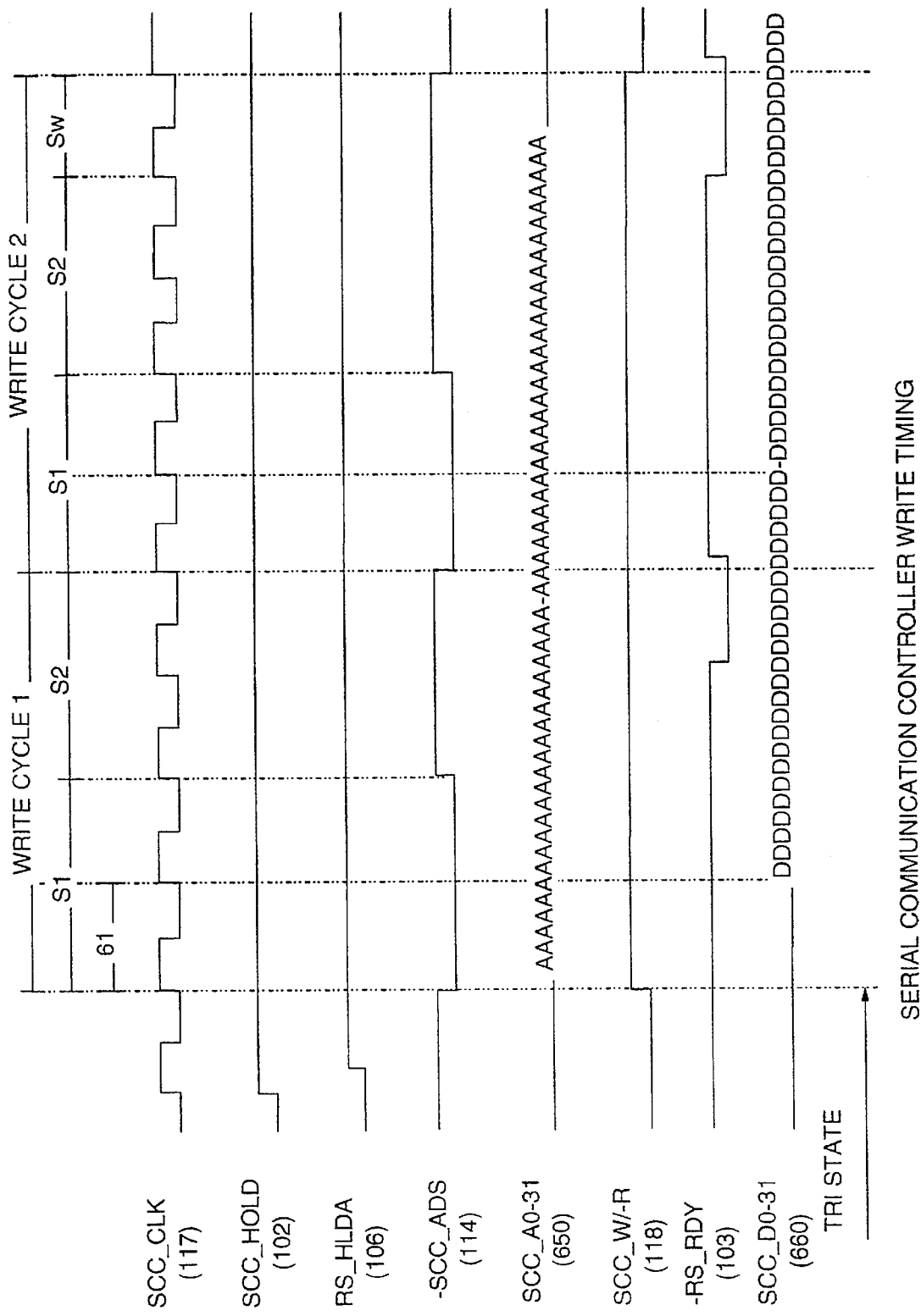
Figure 14:
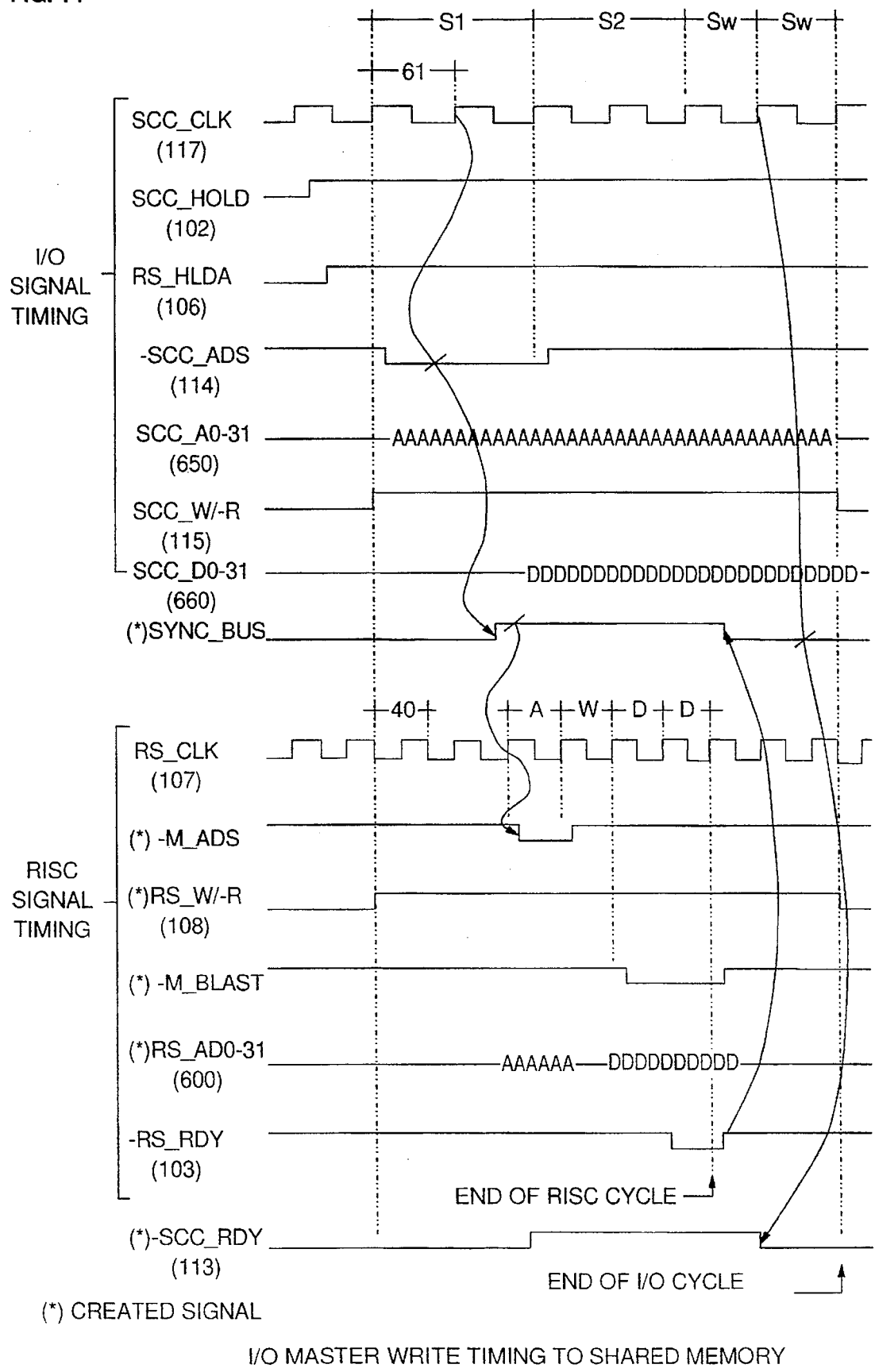

By the WRITE_MASTER operation the Serial Communication Controller 200 is allowed to write parameters into the shared memory 130 through the memory controller 120. This will now be described with reference to FIGS. 13 and 14. Additionally, FIGS. 15 and 16 describes the control logic 310 and the state machine 300 which are used for generating the master control signals (SYNC_BUS, -M_BLAST and -M_ADS) which will be described with more details.

Assuming that Serial Communication Controller, SCC chip 200 wishes to write into the shared memory 130. Being a master peripheral, SCC chip 200 requests the system bus by activating the SCC_HOLD bus request signal lead 102. On the occurrence of the latter signal, RISC processor 100 performs the three following tasks. Firstly, RISC processor 100 terminates its current cycle that is to say, assuming that it was performing a write operation, it completes the latter before releasing the system bus 600 for example. Secondly, it tri-states (high impedance) both RS_RDY signal on lead 103, -RS_ADS signal on lead 104, RS_BLAST signal on lead 106 and RS_W/-R signal on lead 108 and the multiplexed address/data bus 600. At last, it activates the RS_HLDA bus acknowledge signal on lead 106 in order to inform the SCC chip 200 that the system bus 600 is released. Then, SCC chip 200 activates the -SCC_ADS address strobe signal and the SCC_W/-R write signal. Additionally, SCC chip 200 generates on bus 650 through SCC_A0-31 pin the address location of the memory 130 where the data will be stored. The data to be stored is also generated on data bus 660.

It should be noticed that the timing of the SCC chip 200 is controlled by means of the clock signal (SCC_CLK on lead 117) which is generated by a oscillator circuit 340 while the timing of the memory controller circuit 120 is controlled by means of the clock circuit 110 driving the RISC processor 100. It should also be noticed that clock circuit 110 which drives the RISC processor 100 generally operates faster than clock circuit 340. The synchronization of both memory controller 120 and SCC chip 200 is achieved by means of the control logic circuit 310. For this purpose, the control logic 310 produces a SYNC_BUS signal which is activated when SCC chip 200 generates SCC_ADS signal on lead 114. Conversely, it is deactivated when the memory controller 120 generates the -RS_RDY control signal. When the SYNC_BUS signal is activated, the state machine 300 generates a signal M_ADS through its output OUT2, said signal is transmitted to buffer 330 and results in the activation of -RS_ADS on lead 104. Similarly, the state machine 300 generates a signal M_BLAST through its output OUT1, said signal is transmitted to buffer 320 and results in the activation of -RS_BLAST on lead 105. This is achieved since the control lead of both buffers 320 and 330 receives the RS_HLDA signal on lead 106 activated by RISC processor 100.

In addition, memory controller 120 receives SCC_W/-R write signal generated by SCC chip 200 through buffer 480. This is achieved since control lead of buffer 480 receives RS_HLDA signal on lead 106 activated by RISC processor 100.

The memory address generated by SCC chip 200 on bus 650 is transmitted to the memory controller 120 onto the multiplexed address/data bus 600 through buffer 360. This is achieved during the activation of -RS_ADS signal since the Output_Enable (OE) pin of buffer 360 receives on its pin OUT2 the output signal generated by the state machine 300. It should be noticed that the address is only made available on the bus 600 during the activation of -RS_ADS signal which is generated by the state machine circuit 300.

The data to be stored in the shared memory 130, and generated by SCC chip 200, are also transmitted to the memory controller 120 by means of the multiplexed address/data bus 600 through buffer 420. This is performed when the Output_Enable (OE) pin of the latter buffer receives an activation signal generated by AND gate 460. This activation signal comes from OR gate 450 which generates an active signal during the activation of -RS_BLAST signal (transmitted to a first input of said OR gate 450), during a Write_Master operation. As mentioned previously, the Master mode results in the activation of RS_HLDA signal while the Write mode is characterized by the activation of SCC_W/-R signal. The two latter RS_HLDA and SCC_W/-R control signals are respectively transmitted to the corresponding inputs of OR gate 450 via inverters 440 and 470. Therefore, the memory controller is made available all the required control signals as well as the data to be stored within memory 130 and the appropriate address where the storage has to be done. The storage is then made effective in the memory 130.

At this time, the memory controller 120 generates a one_clock_width pulse -RS_RDY on lead 103 representative of the completion of the write operation. This pulse is respectively detected by the state machine 300 on its input pin and by the control logic 310 on its IN3 input pin. Therefore, the control logic 310 causes the deactivation of SYNC_BUS signal which is transmitted to the D input pin of latch 350. Therefore, the latter latch activates -SCC_RDY signal which is transmitted to the SCC chip 200 informing then the latter controller of the completion of the loading of the data into memory storage 130. Then, SCC chip 200 deactivates SCC_W/-R signal on lead 115 as well as ECC_HOLD signal on lead 102. The hold signal is deactivated to inform the RISC processor 100 that the master_write operation is completed. This signal is detected by RISC processor 100 which in turn deactivates RS_HLDA signal on lead 106 in order to get back the control of the system bus.

Figure 15:
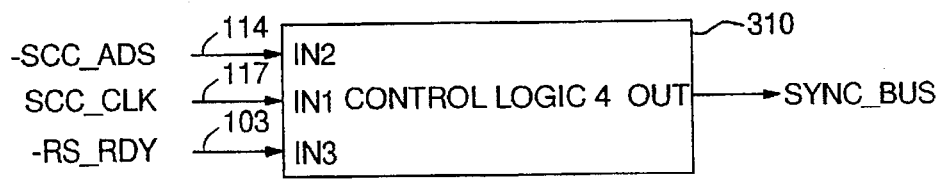

FIG. 15 shows the implementation of the control logic 310 which generates the signal SYNC_BUS according to its three inputs IN1, IN2 and IN3 which respectively receive the signals SCC_CLK on lead 117, -SCC_ADS on leads 114 and -RS_RDY on lead 103.

Figure 16:
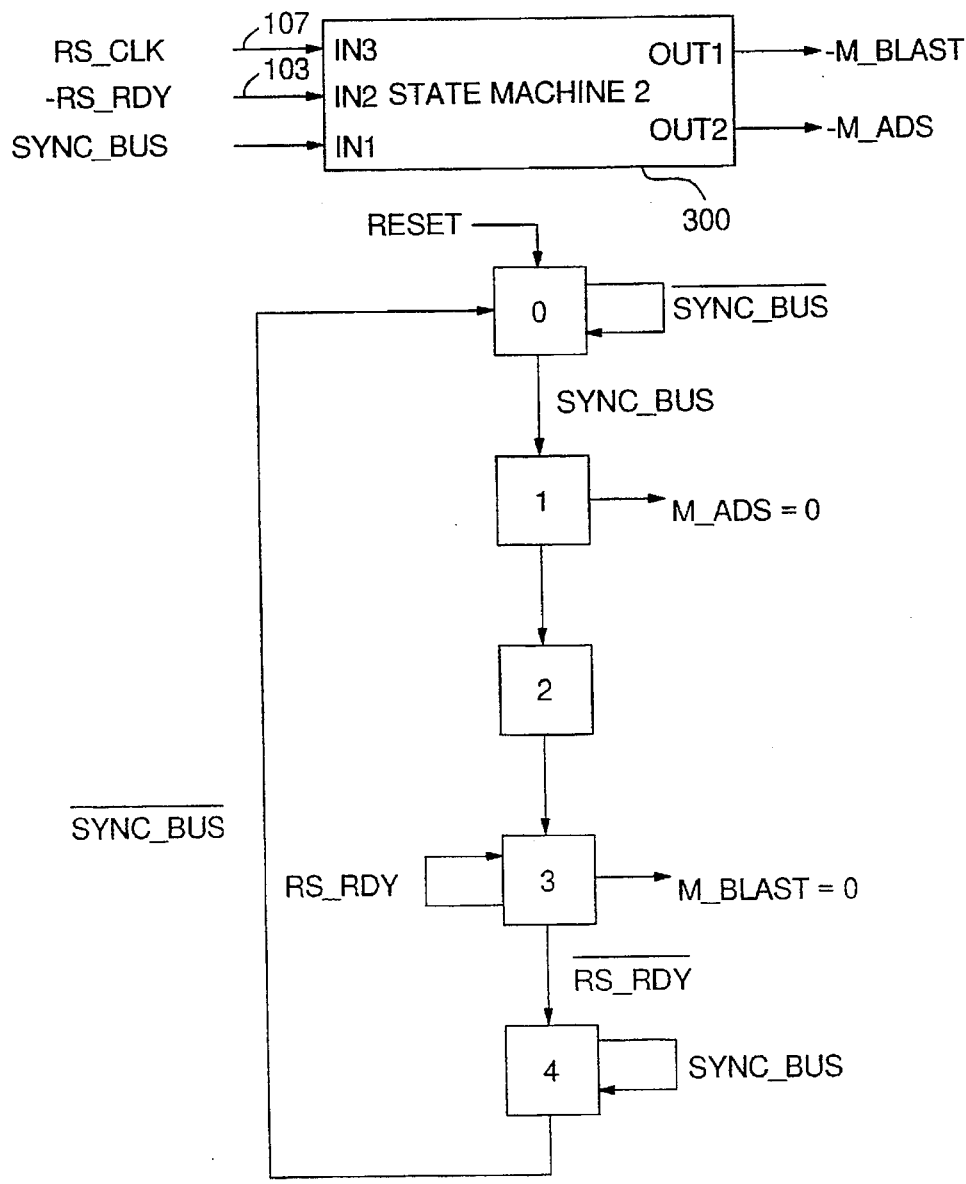

FIG. 16 shows the implementation of the state machine 300 according to the present invention. This state machine has three inputs IN1, IN2 and IN3 which respectively receive the signals SYNC_BUS from the control logic 310, RS_RDY on lead 103 and RS_CLK on lead 107. It generates two output signals -M_BLAST and -M_ADS.

According to the preferred embodiment of the present invention, this state machine has five states (state 0 to state 4). It operates according to the clock signal RS_CLK on lead 107 at the frequency of 25 MHz, the -RS_RDY signal and the SYNC_BUS signal generated by the control logic 310. It is kept at state 0 as long as the signal SYNC_BUS is at zero. When the latter signal is activated, the state machine goes to state 1, sets the output signal M_ADS to 0 and passes successively to state 3 at which step the state machine 2 sets the M_BLAST to zero and is kept at this state as long as the RS_RDY is at its high level. The state machine passes to state 4 when the RS_RDY returns to 0, and is kept to this state as long as the SYNC_BUS signal is at its high level. It returns to state 0 when the SYNC_BUS signal returns to idle.

IV) READ OPERATION IN MASTER MODE (read_master operation)

Figure 17:
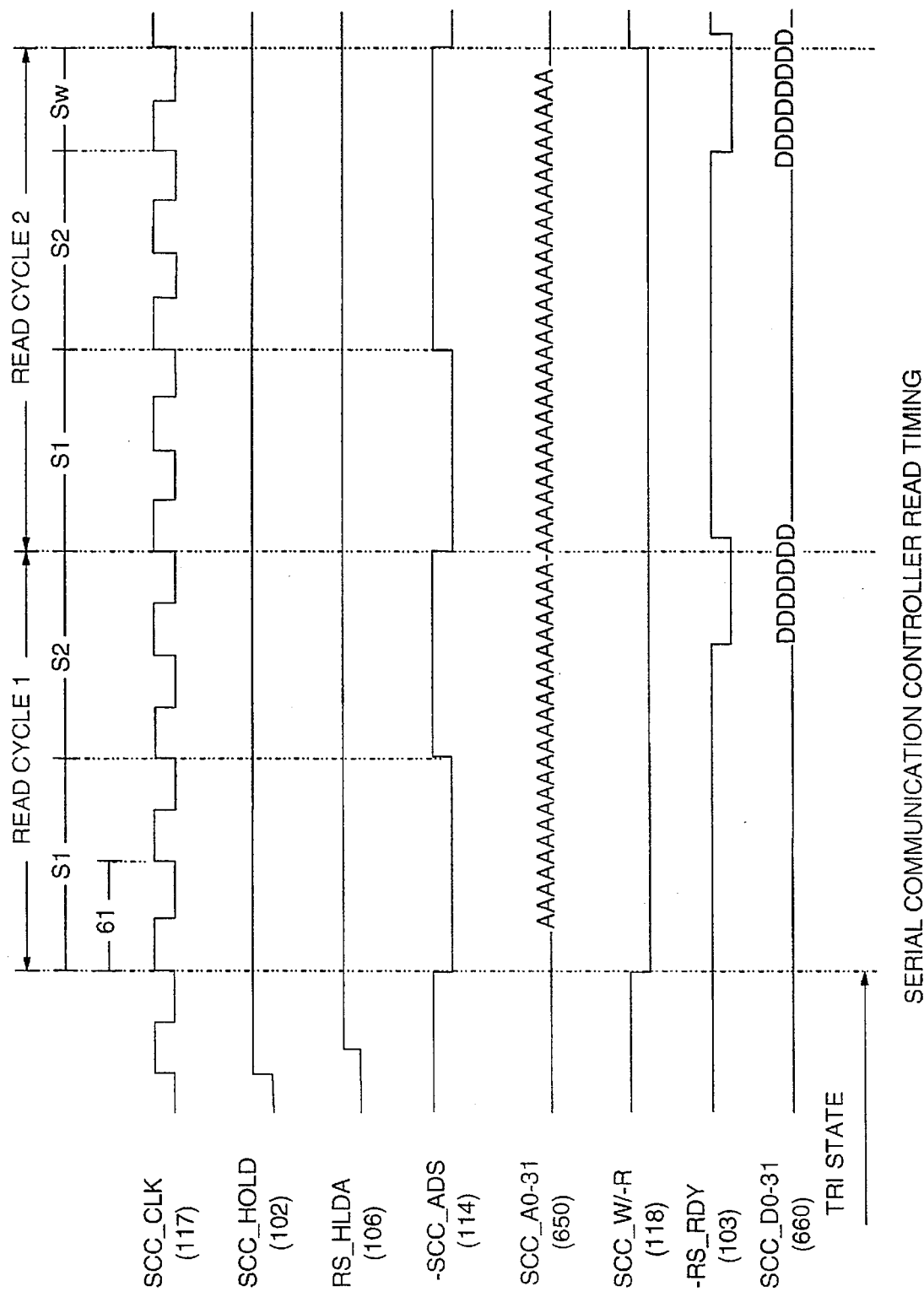
Figure 18:
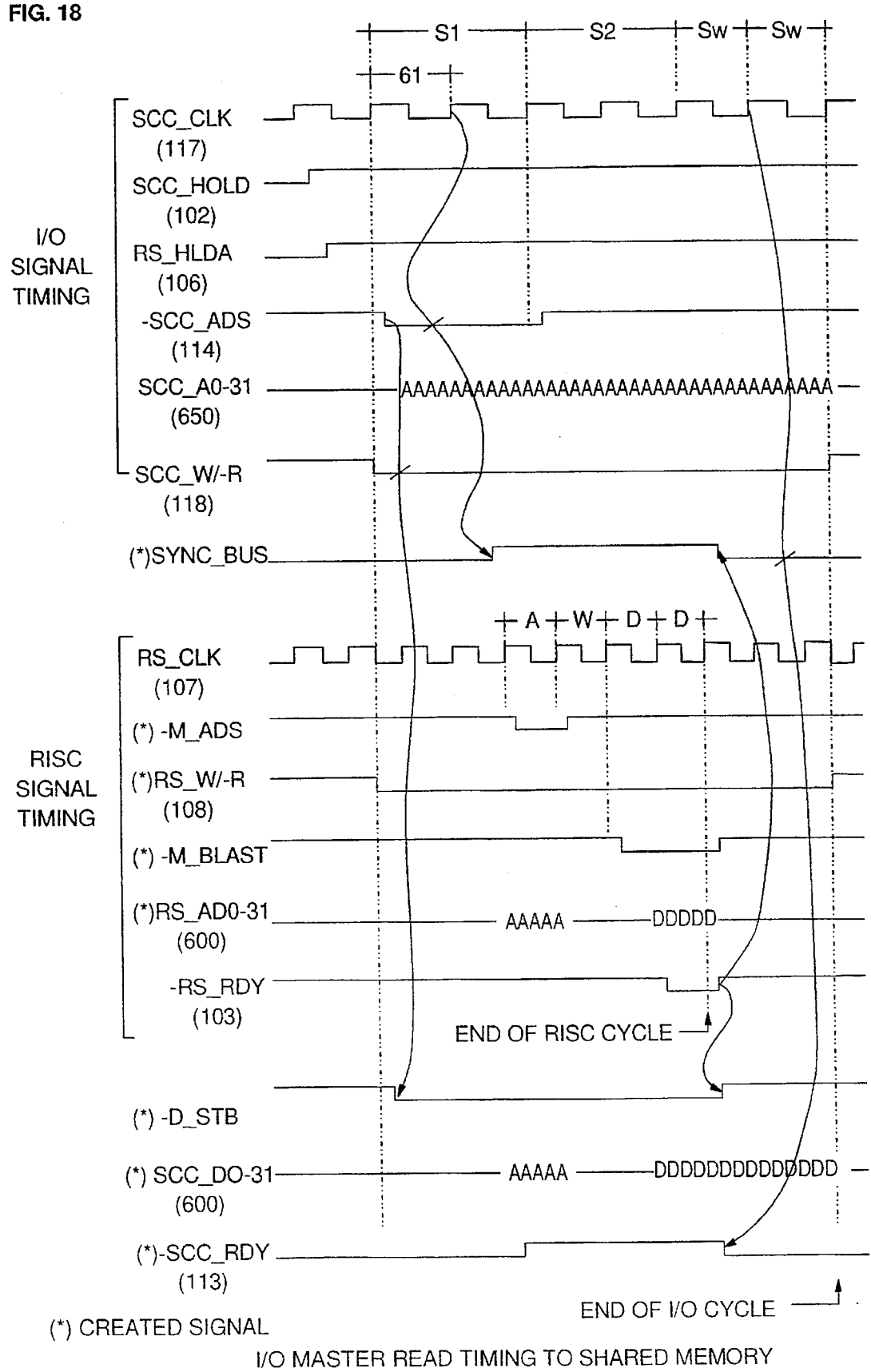
Figure 19:
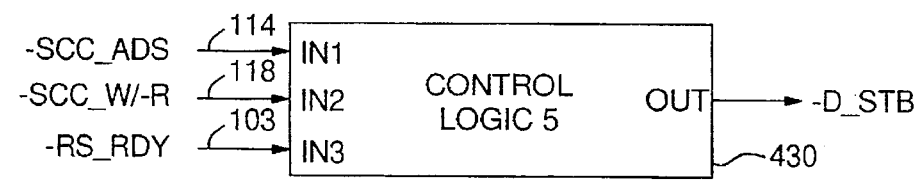

By a READ_MASTER operation, the SCC serial communication controller chip 200 reads the contents of a shared memory location 130 through the memory controller 120. This will now be described in association with the timing diagrams shown in FIGS. 17 and 18. Additionally, FIG. 19 illustrates the control logic 430 which is used for generating the master control signal -D_STB which will be described hereinafter with more details.

Assuming that SCC chip 200 wishes to read from the shared memory. Being a master peripheral, the serial communication controller 200 requests the system bus by activating the SCC_HOLD bus request signal on lead 102. When RISC processor 100 detects this bus request signal, it takes three actions. Firstly, it terminates its current cycle. Secondly, it tri-states both the -RS_RDY signal on lead 103, the -RS_ADS signal on lead 104, the -RS_BLAST signal on lead 105, the RS_W/-R signal on lead 108 and the multiplexed address/data bus 600. Finally, it activates the RS_HLDA bus acknowledge signal on lead 106 to inform the SCC chip 200 that bus 600 is released.

When the SCC chip 200 detects the activation of the bus acknowledge signal HLDA on lead 106, it activates the SCC_ADS address strobe signal and the SCC_W/-R read signal. Additionally the SCC 200 puts the memory address location onto bus 650.

When the SYNC_BUS signal is activated, the state machine 300 generates the -RS_ADS signal on lead 104 through the buffer 330 and the -RS_BLAST signal on lead 105 through the buffer 320. This is achieved since the Enable lead of both buffer 320 and buffer 330 are connected to the RS_HLDA output pin of RISC processor 100. For a read master operation RISC processor 100 activates the RS_HLDA signal and therefore buffer 320 and buffer 330 are enabled.

In addition to these two control signals the memory controller 120 receives the SCC_W/-R read signal through the buffer 480 on lead 108. This is achieved since the Enable lead of buffer 480 is connected to the RS_HLDA output pin of RISC processor 100. For a master read operation RISC processor 100 activates the RS_HLDA signal and therefore buffer 480 is enabled.

The memory address generated by the SCC chip 200 on bus 650 is transmitted to the memory controller 120 on the multiplexed address/data bus 600 through buffer 360. This is achieved during the activation of the -RS_ADS signal since the Output_Enable pin of buffer 360 is connected to the output lead of the state machine 300 generating the address strobe signal.

When the contents of the memory address location is available from the shared memory 130, the memory controller 120 outputs the data onto the multiplexed RS_AD0-31 address/data bus 600 and generates a one-clock pulse width onto the -RS_RDY signal on lead 103. The contents of the bus 600 is latched into latch 400 on the rising edge of its STB strobe input lead. This control signal is generated by the control_logic 430 (referred as -D_STB in FIG. 19). The activation of the -SCC_ADS signal during a SCC chip 200 read operation generates the falling edge of this control signal while the activation of the -RS_RDY signal generates its rising edge. The output of latch 400 is transmitted to the SCC chip 200 onto bus 660 through buffer 410. This is achieved since the SCC_W/-R read signal activates the Output_Enable pin of buffer 410 through AND gate 490.

The control logic 310 detects this ready signal and deactivates the SYNC_BUS signal which in turn activates the SCC_RDY signal. The SCC chip 200 detects this ready signal and is made aware that the contents of the memory address location is available onto the SCC_D0-31 bus 660. The SCC chip 200 reads the data bus on the next rising edge of its own clock and then the SCC chip 200 deactivates the SCC_W/-R read signal and the SCC_HOLD signal. RISC processor 100 detects the deactivation of RS_HOLD signal on lead 102 and in turn deactivates its RS_HLDA signal on lead 106.

FIG. 19 shows the implementation of the control logic 430 which generates the signal -D_STB according to its three inputs IN1, IN2 and IN3 which respectively receive the signals -SCC_ADS on lead 114, SCC_W/-R on lead 115 and -RS_RDY on lead 103.

It should be noticed that the READ_MASTER operation is particularly used by SCC chip 200 for performing an auto initialization by which the latter reads some parameters initially loaded into memory 130 by RISC processor 100, and by which the SCC chip 200 stores into its own registers as programming parameters determining its operating mode (E1 or T1 operations etc . . . ).

Prior to any SCC 200 chip operations, the RISC processor 100 has to initialize the shared memory with the three following configuration parameters: the control and configuration section, the interrupt circular queue and the descriptor and data sections, refer to Siemens SCC data sheet for more details.

These sections are located at a predefined address called 'configuration start address'. The SCC chip 200 configuration input bus C0-C4 receives by hardware this configuration start address, encoded on 5 bits (the decoding algorithm is residing within the chip).

When the different sections are initialized in the shared memory, the RISC processor 100 does a write operation to the SCC chip 200 address location. This address is decoded by the address_decode circuit 630 and the output pin is activated. The SCC chip 200 detects this pulse on its input Action_Request pin -SCC_AR and starts several read master operations starting from the configuration start address to understand the action requested by RISC processor 100 to operate according to the network characteristics.

On the other side, when the SCC chip 200 has stored a received network frame into the shared memory 130, activates the interrupt signal SCC_INT on lead 101 to inform RISC processor 100 that an event has just occurred.

The present invention is not limited to be used in telecommunication systems, it may be implemented in other environments such as for example the multimedia applications or other applications using multiprocessors.

We claim:

1. A conversion circuit (140) for interfacing a RISC processor (100) using a RISC interface bus to peripheral circuit (200, 210) using a CISC interface bus 4 and connected to a network, said RISC interface bus comprising a bidirectional multiplexed address/data 6 bus (600), RISC control lines (leads 101 to 108) and operating at the frequency defined by a first oscillator (110), said CISC interface bus comprising separated data bus (660) and address bus (650), control lines and operating at a second frequency defined by a second oscillator (340) running slower than the first oscillator; said conversion circuit (140) and said RISC processor (100) being connected by said RISC interface bus to a memory storage (130) through a memory controller (120); said conversion circuit (140) being characterized in that it comprises:

first means for receiving addresses and data on said bidirectional multiplexed bus (600) from the RISC processor (100) and from said memory controller (120) to transmit separately on said CISC data bus (660) and address bus (650) to the peripheral circuit (200, 210), in accordance with the CISC timing diagrams and whereby said RISC processor (100) is allowed to have access for read or write operations into internal registers of said peripheral circuit (210); and second means for receiving addresses and data on said address CISC bus (650) and data on said data CISC bus (660) from the peripheral circuit (200, 210) to transmit on said bidirectional multiplexed RISC bus (600) to the RISC processor (100) and to the memory storage (130) through the memory controller (120), in accordance with the RISC timing diagrams and whereby said peripheral circuit (200) is allowed to have access for read or write operations into the memory storage (130).

2. The conversion circuit (140) of claim 1 wherein said first means for receiving addresses and data from the RISC processor includes means dedicated to the address transmission and the data transmission, said means dedicated to the address transmission comprising:

a first control logic (640) for enabling the read or write operations into said internal registers, said first control logic receiving a first control signal RS_ADS (lead 104) and a second control signal RS_BLAST (lead 105) from said RISC processor (100) and therefrom generating a third control signal AS_EN to perform said read or write operations; and a first latch (610) responsive to said third control signal AS_EN to transmit addresses received from the RISC processor (100) to an address decode circuit (630) and to a first buffer (620); wherein both the address decode circuit and the first buffer are responsive to a fourth control signal RS_HLDA (lead 106) deactivated by the RISC processor when it wishes to access the internal registers for Write/Read operations; and wherein said address decode circuit is also responsive to said third control signal AS_EN to select which of the internal registers the RISC processor wishes to access by providing a chip select control signal IO_CS to said peripheral circuit (210); and said means dedicated to the data transmission comprising:

a second control logic circuit (500) responsive to a write/read control signal RS_W/R (lead 108) generated from the RISC processor indicating whether it is a Write operation or a Read operation and to said chip select control signal IO_CS to provide an activation signal OE_D_IO;

a second buffer (410) responsive to said activation signal OE_D_IO for transmitting the data received from the RISC processor to the peripheral circuit (210);

a first state machine (520) responsive to said chip select IO_CS for generating a ready signal IO_RDY;

a third control logic circuit (510) responsive to said ready signal IO_RDY and to said chip select signal IO_CS for generating a fifth control signal IO_WR to said peripheral circuit informing that the data are ready to be written into the internal registers;

an OR gate (540) responsive to said second control signal RS_BLAST and the write/read control signal RS_W/R for generating a sixth control signal IO_RD to said peripheral circuit informing that the data are ready to be read from the internal registers;

a third buffer (420) for receiving the data output from the selected internal registers of said peripheral circuit on said bus (660) and for transmitting said data on said bidirectional multiplexed address/data RISC bus (600); and a fourth buffer (530) responsive to said chip select signal IO_CS and to said ready signal IO_RDY for generating a signal to the RISC processor (100) to inform that the Write/Read operation has been completed.

3. The conversion circuit (140) of claim 1 or 2 wherein said second means for receiving addresses and data from the peripheral circuit includes means dedicated to the address transmission and data transmission; said means dedicated to the address transmission comprising:

a fourth control logic (310) responsive to a seventh control signal RS_RDY (lead 103) from the memory controller (120) and an eighth control signal SCC_ADS (lead 114) from said peripheral circuit for synchronizing said RISC bus interface with said CISC bus interface by generating a synchronization signal SYNC_BUS;

a second state machine (300) responsive to said synchronization signal SYNC_BUS and to said seventh control signal RS_RDY for generating respectively two control signals M_BLAST and M_ADS to fifth and sixth buffers (320, 330) both also responsive to the fourth control signal RS_HLDA activated by the RISC processor when said peripheral circuit wishes to access the shared memory (130) to activate said first and second control signals RS-ADS and RS_BLAST; and a seventh buffer (360) responsive to said signal M_ADS for transmitting addresses from said peripheral circuit to the memory controller on said bidirectional multiplexed RISC bus (600); and said means dedicated to the data transmission comprising:

an eighth buffer (480) receiving a control signal of Write or Read operation SCC_W/R (lead 115) from the peripheral circuit (200) and responsive to said fourth control signal RS_HLDA for generating a write/read signal to the memory controller (120);

an OR gate (450) which during the activation of said second control signal RS_BLAST generates an active signal to said third buffer (420) for enabling the data to be transmitted from the peripheral circuit (200) to the memory storage (130) for a write operation;

a fifth control logic (430) responsive to said seventh control signal RS_RDY (lead 103) of said memory controller (120) for generating a control signal D_STB to a second latch (400) connected to said second buffer (410) to enable the data to be transmitted from the memory storage (130) to the peripheral circuit (210) for a read operation; and a third latch (350) responsive to the deactivation of said synchronization signal SYNC_BUS from said fourth control logic (310) for generating a ninth control signal SCC_RDY (lead 113) to inform said peripheral circuit (200) of the completion of the write/read operation.

4. The conversion circuit (140) according to claim 1 wherein said peripheral circuit comprises two means:

means (210) for converting the received and transmitted data carried by a pulse coded modulation (PCM) signals from the network into time division multiplex signals (TDM), said means comprising the internal registers and being controlled and accessed by said RISC processor (100) through said conversion circuit (140); and means (200) for processing said time division multiplex signals and comprising its own programming parameters for accessing directly the memory storage (130) and configuration input bus C0-C4 encoded on five bits for enabling the configuration of said second means through the shared memory (130).

5. The data communication system according to claim 3 wherein said first state machine (520) is clocked by the RISC processor clock signal (lead 107) and comprises six states (state 0 to state 5), whereby the first state machine is kept at state 0 as long as it does not detect the signal $IO_{13}$ CS from the address decode (630), whereby four RISC cycles are required between the detection of said signal IO__CS and the emission of said ready signal IO__RDY at state 4 and whereby the first state machine is kept at state 5 until it detects again the signal IO__CS.

6. The data communication system according to claim 3 wherein said second state machine (300) is clocked by the RISC processor clock signal (lead 107) and comprises five states (state 0 to state 4), whereby said second state machine goes to state 1 when it detects the synchronization signal SYNC__BUS from the fourth control logic (310) at which state it emits the signal M__ADS, whereby two RISC cycles are required before it emits the M__BLAST signal, whereby it goes to state 4 at the detection of the seventh signal RS__RDY and whereby it is kept at state 4 until it detects again the synchronization signal SYNC__BUS.

7. A conversion method to be used in a conversion circuit (140) for interfacing a RISC processor (100) using a RISC interface bus to peripheral circuit (200, 210) using a CISC interface bus and connected to a network, said RISC interface bus comprising a bidirectional multiplexed address/data bus (600), RISC control lines (leads 101 to 108) and operating at the frequency defined by a first oscillator (110), said CISC interface bus comprising separated data bus (660) and address bus (650), control lines and operating at a second frequency defined by a second oscillator (340) running slower than the first oscillator; said conversion circuit (140) and said RISC processor (100) being connected by said RISC interface bus to a memory storage (130) through a memory controller (120); and said conversion circuit (140) comprising first means for receiving addresses and data on said bidirectional multiplexed bus (600) from the RISC processor (100) and from said memory controller (120) to transmit them separately on said CISC data bus (660) and address bus (650) to the peripheral circuit (200, 210), respecting the CISC timing diagrams and whereby said RISC processor (100) is allowed to have access for read or write operations into internal registers of said peripheral circuit (210);

said conversion method characterized in that it comprises the steps of:

activating a write/read control signal RS__W/R (lead 108) from the RISC processor to indicate whether a write or a read operation is to be performed into the internal registers of said peripheral circuit;

activating a first control signal RS__ADS (lead 104) and a second control signal RS__BLAST (lead 105) from said RISC processor (100) to transmit to a first control logic (640) generating therefrom a third control signal AS__EN for enabling the read or write operations into said internal registers;

receiving an address from the RISC processor on a first latch (610) responsive to said third control signal AS__EN for transmitting said address to an address decode (630) and to a first buffer (620); wherein both the address decode circuit and the first buffer are responsive to a fourth control signal RS__HLDA (lead 106) deactivated by the RISC processor when it wishes to access the internal registers for Write/Read operations; and wherein said address decode circuit is also responsive to said third control signal AS__EN to select which of the internal registers the RISC processor wishes to access by providing a chip select control signal IO__CS to said peripheral circuit (210);

generating an activation signal OE__D__IO from a second control logic circuit (500) responsive to said write/read control signal RS__W/R (lead 108) from RISC processor and to said chip select control signal IO__CS;

receiving the data transmitted from the RISC processor to a second buffer (410); said second buffer being responsive to said activation signal OE__D__IO for transmitting said data to the peripheral circuit (210);

generating a ready signal IO__RDY from a first state machine (520) responsive to said chip select signal IO__CS;

generating a fifth control signal IO__WR from a third control logic circuit (510) responsive to said ready signal IO__RDY and said chip select signal IO__CS to the peripheral circuit (210) informing that the data are ready to be written into the internal registers;

generating a sixth control signal IO__RD from an OR gate (540) responsive to the second control signal RS__BLAST (lead 105) and the write/read control signal RS__W/R (lead 108) of the RISC processor to said peripheral circuit (210) informing that the data are ready to be read from the internal registers;

transmitting the data output from the selected internal registers of said peripheral circuit on said bus (660) to a third buffer (420) which therefrom transmits said data on said bidirectional multiplexed address/data RISC bus (600); and generating a signal from a fourth buffer (530) responsive to said chip select signal IO__CS and to said ready signal IO__RDY to the RISC processor to inform that the Write/Read operation has been completed.

8. The conversion method according to claim 7 wherein said conversion circuit (140) further comprises second means for receiving addresses on said address CISC bus (650) and data on said data CISC bus (660) from the peripheral circuit (200, 210) to transmit on said bidirectional multiplexed RISC bus (600) to the RISC processor (100) and to the memory storage (130) through the memory controller (120), respecting the RISC timing diagrams and whereby said peripheral circuit (200) is allowed to have access for read or write operations into the memory storage (130), said conversion method characterized in that it comprises the steps of:

generating a synchronization signal SYNC__BUS from a fourth control logic (310) for synchronizing said RISC bus interface to said CISC bus interface, said fourth control logic being responsive to a seventh control signal RS__RDY (lead 103) of the memory controller and an eighth control signal SCC__ADS (lead 114) from the peripheral circuit (200);

generating respectively two control signals M__BLAST and M__ADS to fifth and sixth buffers (320, 330) from a second state machine (300) responsive to said synchronization signal SYNC_BUS and to said seventh control signal RS_RDY, said fifth and sixth buffers being both responsive to the activation of said fourth control signal RS_HLDA activated by the RISC processor (100) when said peripheral circuit wishes to access the memory storage (130) to activate said first and second control signals RS_ADS and RS_BLAST;

transmitting from a seventh buffer (360) addresses send by said peripheral circuit (200) to the memory controller (120) on said bidirectional multiplexed RISC bus (600), said seventh buffer (360) being responsive to the signal M_ADS;

generating a write/read signal to the memory controller (120) from an eighth buffer (480) receiving a control signal of write or read operation SCC_W/R (lead 115) from the peripheral circuit (200) and responsive to said fourth control signal RS_HLDA;

generating an active signal from an OR gate (450) during the activation of said second control signal RS_BLAST to said third buffer (420) for enabling the data to be transmitted from the peripheral circuit (200) to the memory storage (130) for a write operation;

generating a control signal D_STB from a fifth control logic (430) responsive to said seventh control signal RS_RDY (lead 103) of said memory controller (120) to a second latch connected to said second buffer (410) to enable the data to be transmitted from the memory storage (130) to the peripheral circuit (210) for a read operation; and generating a ninth control signal SCC_RDY (lead 113) from a third latch (350) responsive to the deactivation of said synchronization signal SYNC_BUS to inform said peripheral circuit (200) of the completion of the write/read operation.

9. The conversion method of claim 7 for enabling the configuration of said means (200) for processing said time division multiplex signals by further comprising the steps of:

prior to any operations, configuring the parameters of said second means (200) in the shared memory (130) by said RISC processor (100); and receiving said configuration parameters on the inputs C0-C5 of said second means (200) with the corresponding configurations address in said shared memory (100) enabling therefore said second means to have access directly in said shared memory (130).

* * * * *